United States Patent
Oka

(10) Patent No.: US 10,186,073 B2
(45) Date of Patent: Jan. 22, 2019

(54) IMAGE PROCESSING DEVICE, IMAGE PROCESSING METHOD, AND DATA STRUCTURE OF IMAGE FILE

(71) Applicant: SONY COMPUTER ENTERTAINMENT INC., Tokyo (JP)

(72) Inventor: Masaaki Oka, Kanagawa (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 701 days.

(21) Appl. No.: 14/411,214

(22) PCT Filed: Apr. 24, 2013

(86) PCT No.: PCT/JP2013/002793
§ 371 (c)(1),
(2) Date: Dec. 24, 2014

(87) PCT Pub. No.: WO2014/020801
PCT Pub. Date: Feb. 6, 2014

(65) Prior Publication Data
US 2015/0254891 A1    Sep. 10, 2015

(30) Foreign Application Priority Data
Jul. 31, 2012  (JP) .................. 2012-170626

(51) Int. Cl.
*G06T 15/20*   (2011.01)
*G06T 17/05*   (2011.01)
(Continued)

(52) U.S. Cl.
CPC .......... *G06T 15/205* (2013.01); *G06T 15/503* (2013.01); *G06T 17/05* (2013.01);
(Continued)

(58) Field of Classification Search
None
See application file for complete search history.

(56) References Cited

U.S. PATENT DOCUMENTS

| | | | |
|---|---|---|---|
| 6,563,999 B1 | 5/2003 | Suzuoki | |
| 2006/0025674 A1* | 2/2006 | Kiraly | G06T 3/0037 600/410 |

(Continued)

FOREIGN PATENT DOCUMENTS

| | | |
|---|---|---|
| JP | 2004-054634 A | 2/2004 |
| JP | 2006-98626 | 4/2006 |

(Continued)

OTHER PUBLICATIONS

Japanese Decision of Refusal dated Oct. 20, 2015 from corresponding Application No. 2014-527950.

(Continued)

*Primary Examiner* — Peter Hoang
(74) *Attorney, Agent, or Firm* — Katten Muchin Rosenman LLP

(57) ABSTRACT

Thresholds b1, b2, b3, and b4 are set in the luminance of a raw image. In an image 84a of the lowermost layer, the region in which the luminance is equal to or higher than b1 is left. In an image 84b over it, the region in which the luminance is equal to or higher than b2 is left. In an image 84c over it, the region in which the luminance is equal to or higher than b3 is left. In an image 84d of the uppermost layer, the region in which the luminance is equal to or higher than b4 is left. In each of these images, the alpha value of the other region is set to 0. The images are integrated with the color information of the raw image to generate final slice images. A display image is generated by stacking the generated slice images sequentially from the lowermost layer at predetermined intervals and performing drawing according to the point of sight.

12 Claims, 26 Drawing Sheets

(51) Int. Cl.
 *G06T 15/50* (2011.01)
 *G06T 19/20* (2011.01)

(52) U.S. Cl.
 CPC .......... *G06T 19/20* (2013.01); *G06T 2215/12* (2013.01); *G06T 2219/008* (2013.01); *G06T 2219/2004* (2013.01); *G06T 2219/2008* (2013.01)

(56) References Cited

U.S. PATENT DOCUMENTS

| | | | | |
|---|---|---|---|---|
| 2006/0055711 | A1* | 3/2006 | Hayakawa | G06T 7/2033 345/629 |
| 2008/0043024 | A1* | 2/2008 | Schiwietz | G06T 11/006 345/442 |
| 2008/0316207 | A1 | 12/2008 | Tawaraishi | |

FOREIGN PATENT DOCUMENTS

| | | |
|---|---|---|
| JP | 2009-003810 A | 1/2009 |
| WO | 2006/123422 | 11/2006 |

OTHER PUBLICATIONS

International Preliminary Report on Patentability and Written Opinion of the International Searching Authority dated Feb. 12, 2015 from corresponding Application No. PCT/JP2013/002793.
International Search Report dated Jun. 18, 2013, from the corresponding PCT/JP2013/002793.

\* cited by examiner

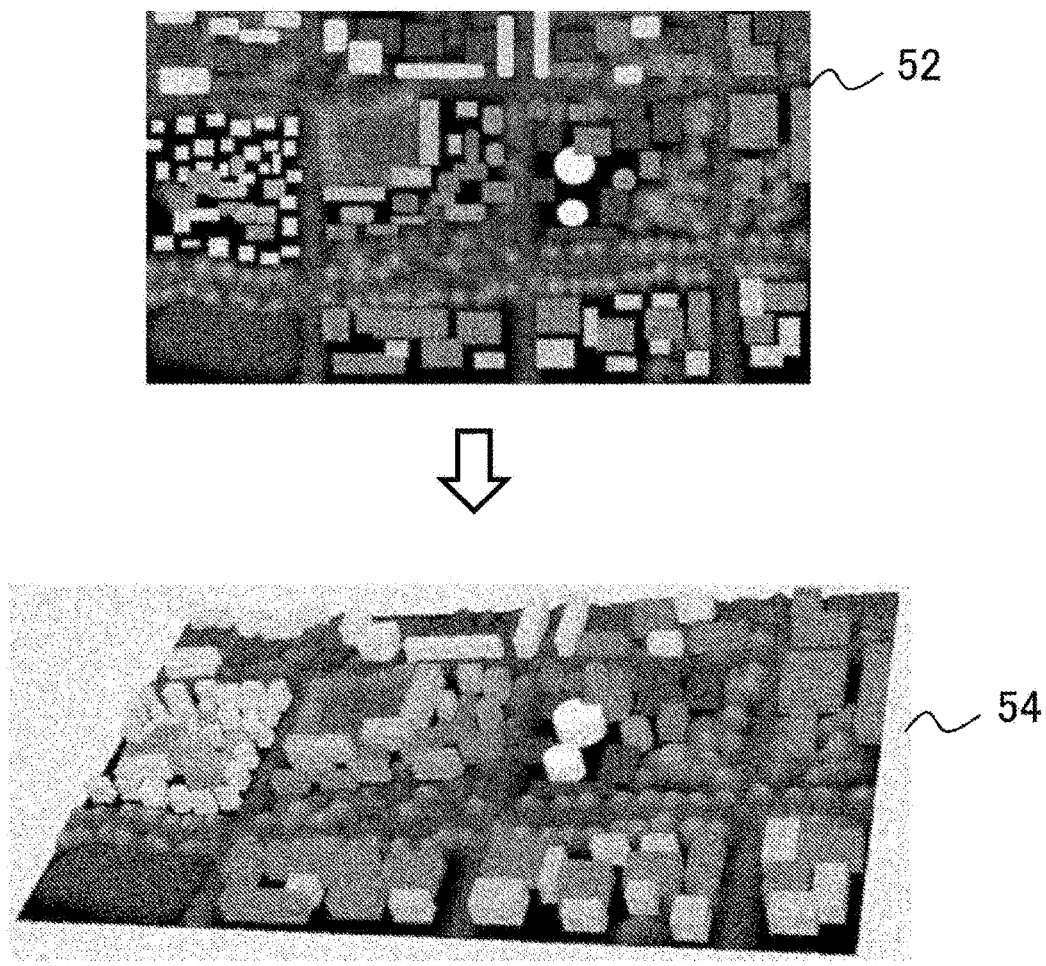
F I G . 1

FIG. 17
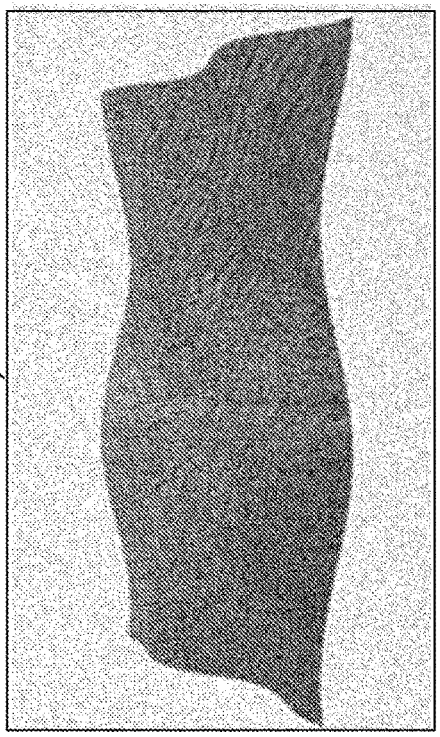
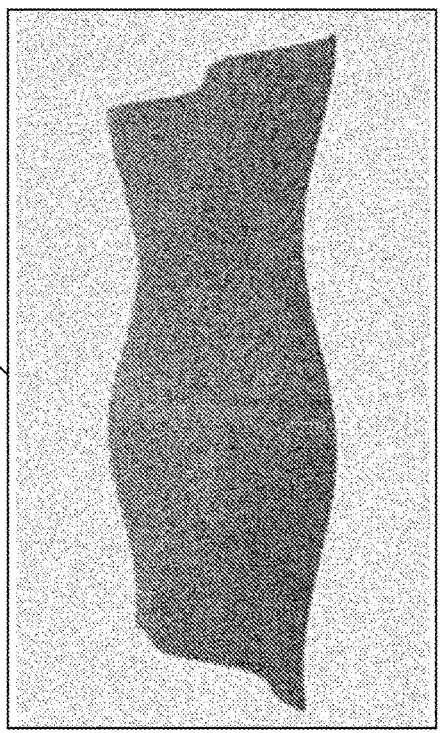
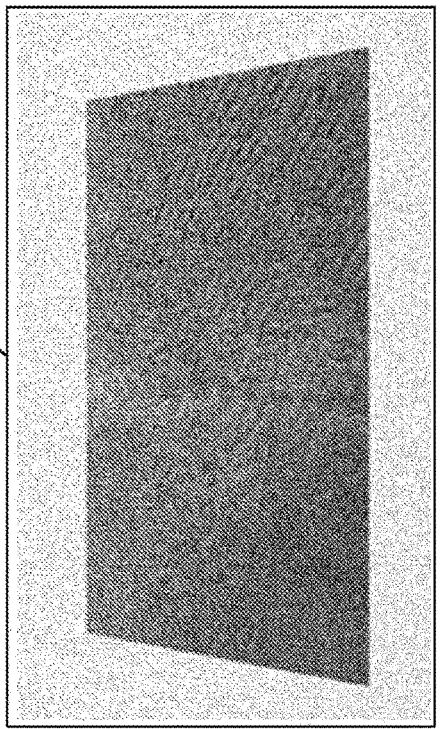
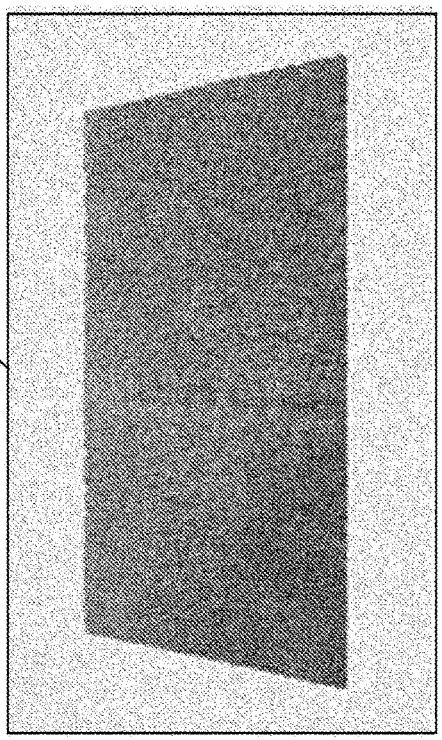

AAA STATION
TIMETABLE 5  40
6  10 30
7  10 25 40 50
8  0 10 20 30 40 50
9  ....

SERVICE INFORMATION: AS USUAL
STATION SEARCH [    ]

376 — 372

AAA STATION
TIMETABLE

5  40
6  10 30
7  10 25 40 50
8  0 10 20 30 40 50
9  ....

SERVICE INFORMATION: AS USUAL
STATION SEARCH [    ]

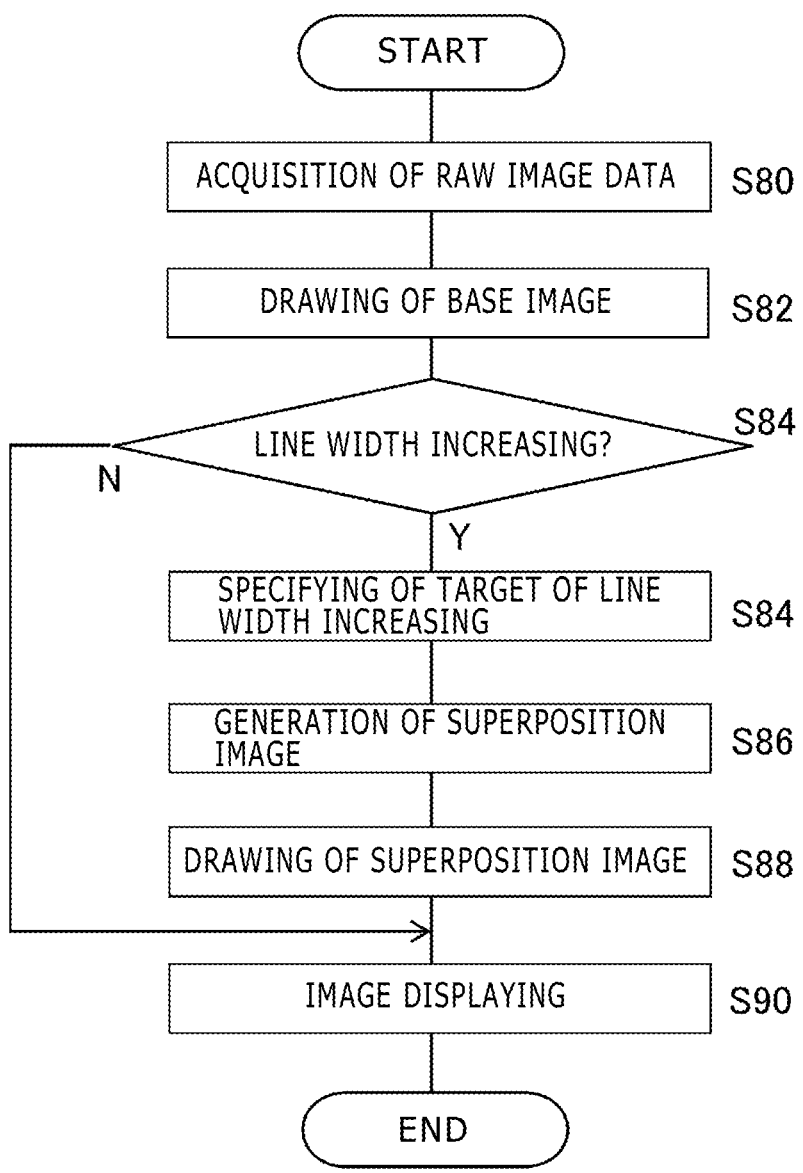

IMAGE PROCESSING DEVICE, IMAGE PROCESSING METHOD, AND DATA STRUCTURE OF IMAGE FILE

TECHNICAL FIELD

The present invention relates to an image processing device that displays an image based on image data, an image processing method used in this device, and a data structure of an image file.

BACKGROUND ART

Techniques of three-dimensional computer graphics are widely used in various fields such as game, video, animation, and design. For example, a home-use entertainment system that can not only execute a game program but also reproduce a moving image has been proposed. In this home-use entertainment system, a GPU generates a three-dimensional image using polygons (refer to e.g. PTL 1). Enhancement in the accuracy and definition of three-dimensional image displaying is being advanced in order to give a person who views the image a more feeling of realism irrespective of the purpose of the displaying. Furthermore, it is becoming common to display content of various kinds of information, image, text, etc. by using an information processing device or a portable terminal irrespective of the three-dimensional image.

CITATION LIST

Patent Literature

[PTL 1]
U.S. Pat. No. 6,563,999 A

SUMMARY

Technical Problems

To draw a three-dimensional model, various data need to be prepared for the display target. Therefore, when creation of content including three-dimensional computer graphics is attempted, work thereof is complicated, which tends to impose a burden on the creator. Furthermore, particularly in e.g. the case of permitting the movement of the point of sight by a user, many data need to be instantaneously processed and therefore the processing load in the device that executes image processing and displaying is also high.

Furthermore, in the case of an image including a large number of characters and figures, such as a web page, particularly when it is displayed on a small display such as a display of a portable terminal, the characters flicker or blur and thus are difficult to read in some cases due to displaying of small characters and figures. Therefore, it is required to realize image displaying that meets the needs of the user and is easier to view without increasing the data size and the processing load.

The present invention is made in view of such problems and an object thereof is to provide an image processing technique that can easily create and display an image with a feeling of realism. Another object of the present invention is to provide an image processing technique that can easily display an image that meets the needs of the user and is easy to view.

Solution to Problems

A certain aspect of the present invention relates to an image processing device. This image processing device includes: a making-region-transparent information generator that assumes height from an image plane for an object represented in an input two-dimensional raw image and identifies a region reaching a slice plane set about the height to generate information to make a region other than the region transparent; and an image drawing section that displays an image obtained by giving a stereoscopic effect to the raw image by drawing, according to the position of a point of sight, a three-dimensional object made by stacking slice images in which part of the raw image is made transparent by using the information to make the region transparent over the raw image in a three-dimensional space according to the height of the slice plane that corresponds.

Another aspect of the present invention also relates to an image processing device. This image processing device includes: a storage that stores image data composed of data of a two-dimensional raw image and data of slice images in which a region other than a region reaching a slice plane set about the height of a represented object from an image plane is made transparent in the raw image; and an image drawing section that displays an image obtained by giving a stereoscopic effect to the raw image by reading out the data of the raw image and the data of the slice images from the storage and drawing, according to the position of a point of sight, a three-dimensional object made by stacking the slice images over the raw image in a three-dimensional space according to the height of the slice plane that corresponds.

Further another aspect of the present invention also relates to an image processing device. This image processing device includes: an image data acquirer that acquires a two-dimensional raw image; and a slice image generator that assumes height from an image plane for an object represented in the raw image and identifies a region reaching a slice plane set about the height to generate slice images that are obtained by making a region other than the region transparent and are to display an image obtained by giving a stereoscopic effect to the raw image by being stacked over the raw image in a three-dimensional space according to the height of the slice plane that corresponds to perform drawing according to the position of a point of sight.

Further another aspect of the present invention relates to an image processing method. This image processing method includes: a step of, by an image processing device, reading out data of a two-dimensional raw image from a storage device, and assuming height from an image plane for an object represented in the raw image, and identifying a region reaching a slice plane set about the height to generate information to make a region other than the region transparent; and a step of displaying an image obtained by giving a stereoscopic effect to the raw image on a display device by drawing, according to the position of a point of sight, a three-dimensional object made by stacking slice images in which part of the raw image is made transparent by using the information to make the region transparent over the raw image in a three-dimensional space according to the height of the slice plane that corresponds.

Further another aspect of the present invention relates to a data structure of an image file. This data structure of an image file is characterized in that data of a two-dimensional image is associated with slice images in which a region other than a region reaching a slice plane set about the height of an object represented in the image from an image plane is made transparent, and an image obtained by giving a stereoscopic effect to the raw image is displayed through readout of the image file in an image processing device and drawing, according to the position of a point of sight, of a three-dimensional object made by stacking the slice images over the raw image in a three-dimensional space according to the height of the slice plane that corresponds.

Further another aspect of the present invention relates to an image processing device. This image processing device includes: a making-region-transparent information generator that acquires data of a raw image and generates information to make a region other than a target region configured by pixels extracted based on a predetermined condition transparent; and an image drawing section that generates data of a display image in which the target region is extended and causes a display device to display the display image by drawing a superposition image in which part of the raw image is made transparent by using the information to make the region transparent on the raw image in a superimposing manner at a position offset by a predetermined offset amount.

Further another aspect of the present invention relates to an image processing method. This image processing method includes: a step of, by an image processing device, reading out data of a raw image from a storage device and generating information to make a region other than a target region extracted based on a predetermined condition transparent; and a step of generating data of a display image in which the target region is extended and causing a display device to display the display image by drawing a superposition image in which part of the raw image is made transparent by using the information to make the region transparent on the raw image in a superimposing manner at a position offset by a predetermined offset amount.

What are obtained by translating arbitrary combinations of the above constituent elements and expressions of the present invention among method, device, system, computer program, and so forth are also effective as aspects of the present invention.

Advantageous Effects of Invention

According to the present invention, an image with a stereoscopic effect can be easily displayed from data of a planar image. Furthermore, a display image can be made easily visible in accordance with a request of a user.

BRIEF DESCRIPTION OF DRAWINGS

FIG. 1 is a diagram showing an example of an image that can be displayed by embodiment 1.

FIG. 17 is a diagram showing effects caused by introduction of slice images and introduction of polygon meshes through comparison of display images in embodiment 1.

FIG. 26 is a diagram showing a screen example displayed on a display unit of embodiment 2.

FIG. 27 is a flowchart showing the processing procedure of image displaying carried out by the image processing device in embodiment 2.

DESCRIPTION OF EMBODIMENTS

Embodiment 1

FIG. 1 shows an example of an image that can be displayed by the present embodiment. The upper side of this diagram is a bird's-eye view 52 of a certain land, such as an aerial photograph. In the present embodiment, a stereoscopic effect is given to such an image represented on a two-dimensional plane to generate a display image 54 naturally displayed also from points of sight other than directly above. For this purpose, apparent side surfaces and top surfaces are generated for objects expected to have height in the original two-dimensional image to thereby produce the stereoscopic effect.

Figure 2:
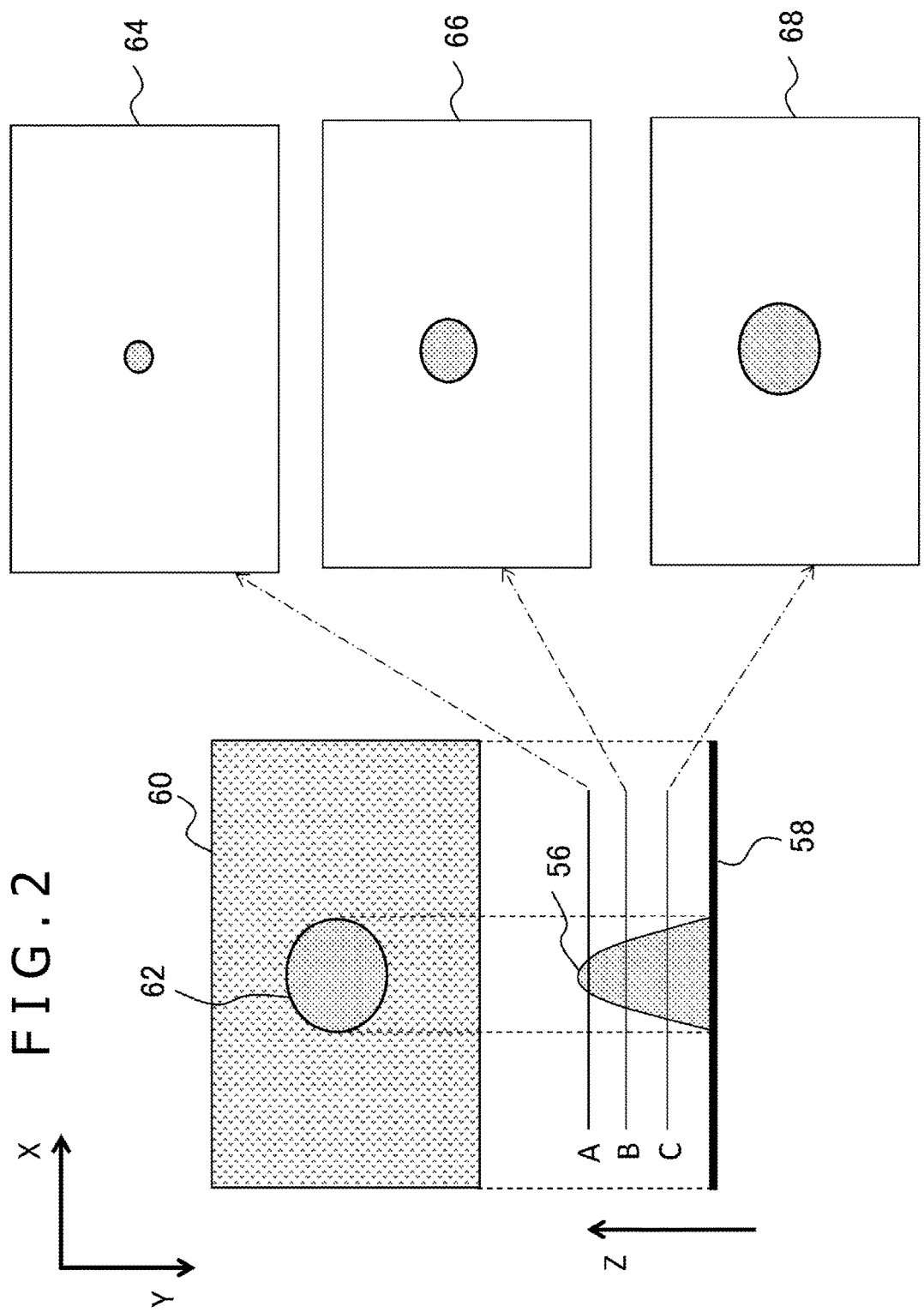
FIG. 2 is a diagram for explaining the principle of giving a stereoscopic effect to a two-dimensional image in embodiment 1.
Figure 3:
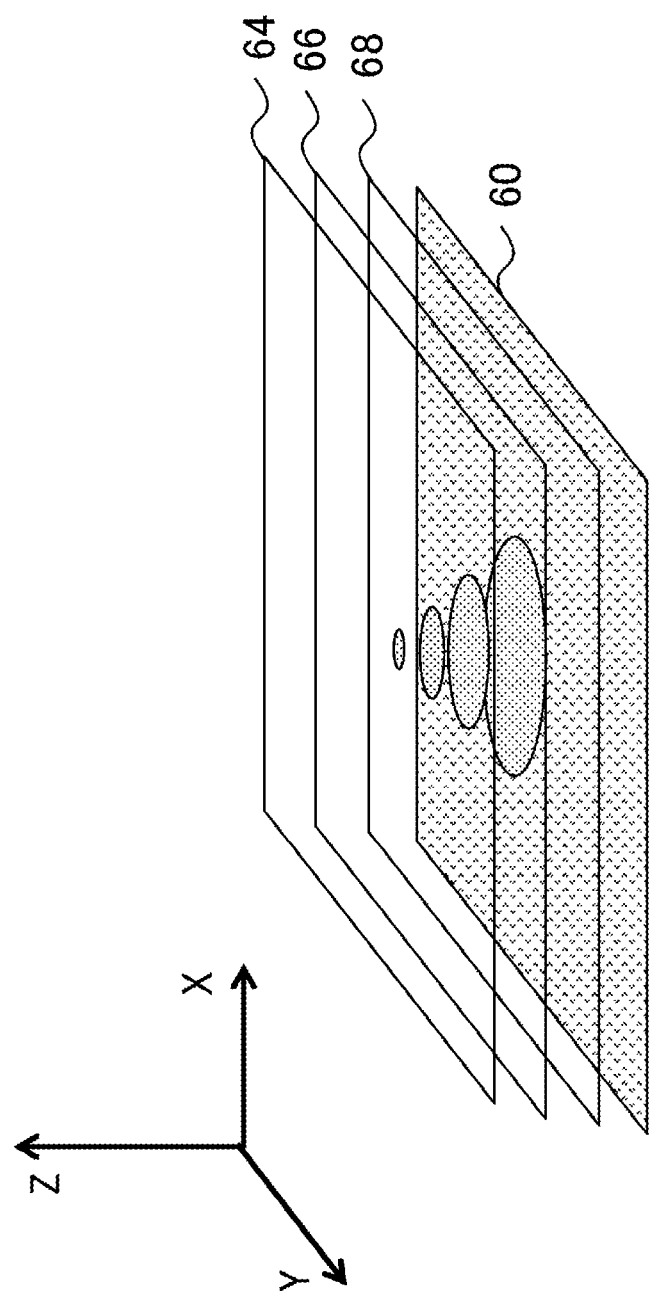
FIG. 3 is a diagram for explaining the principle of giving a stereoscopic effect to a two-dimensional image in embodiment 1.

FIGS. 2 and 3 are diagrams for explaining the principle of giving a stereoscopic effect to a two-dimensional image in the present embodiment. As shown in the left of FIG. 2, in a two-dimensional image 60 obtained by looking down upon a state in which an object 56 having a substantially circular conical shape is put on a board 58, the object 56 is represented as a circle 62 on the background of the top surface of the board 58. On the other hand, to replicate the side surface and top surface of the object 56, the contour of the object in a horizontal plane is integrated in the height direction (Z-direction) in principle. For example, the contour of the object 56 in horizontal planes A, B, and C is obtained if images 64, 66, and 68 of cut planes in these horizontal planes are achieved.

In the present embodiment, the images 64, 66, 68, and so forth of cut planes are generated from the original two-dimensional image 60 in a pseudo manner and are stacked to create apparent side surface and top surface.

Specifically, in the original two-dimensional image 60, a region in which the object 56 is deemed to reach the horizontal plane C is left and the other region is made transparent. The pseudo image 68 of the cut plane is thereby obtained. The same is also about the images 66 and 64 corresponding to the horizontal planes B and A. Hereinafter, the pseudo image of the cut plane generated in this manner will be referred to as the "slice image."

FIG. 3 shows a state in which the original two-dimensional image 60 is set as the lowermost layer and the slice images 68, 66, and 64 are stacked. The X-axis, the Y-axis, and the Z-axis forming a three-dimensional space in this diagram correspond to the X-axis and the Y-axis forming the original image plane and the Z-axis of the height direction in FIG. 2. As shown in the diagram, the side surface and top surface of the object can be substantially replicated by disposing the original image 60 and the slice images 68, 66, and 64 at the positions of the corresponding horizontal planes (hereinafter, referred to as the slice plane) on the Z-axis. When the number of slice images is larger, a more elaborate solid can be expressed.

The stacking interval of the slice images is adjusted depending on the variation range of the point of sight, the number of slice images generated, and so forth. For example, when the variation angle of the point of sight from directly above is suppressed to a small angle, the gap between the slice images is difficult to visually recognize and therefore a stereoscopic effect can be produced more dynamically by widening the interval. On the other hand, when variation to the point of sight close to a directly lateral position is permitted, the gap between the slice images is made inconspicuous by narrowing the interval.

Figure 4:
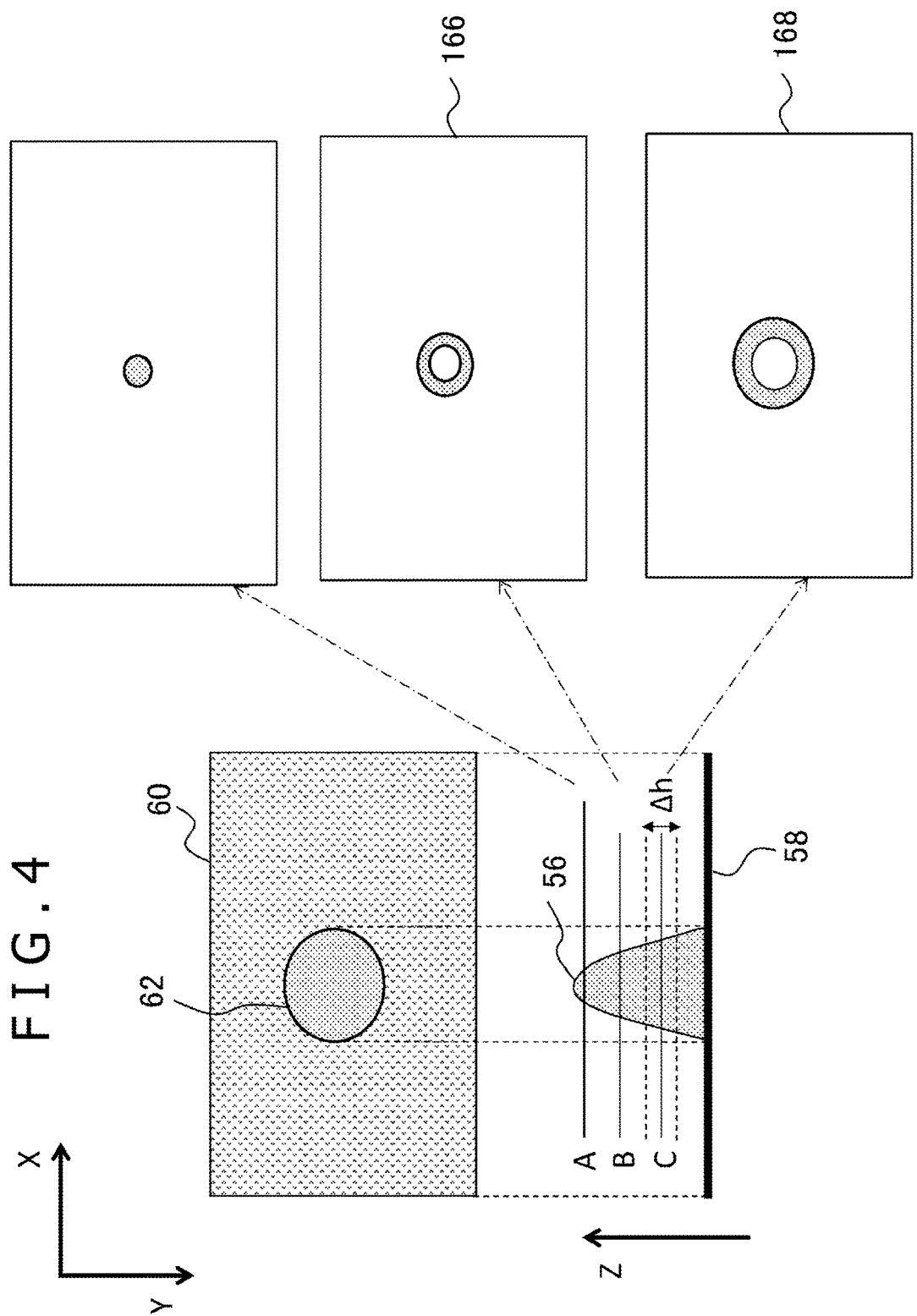
FIG. 4 is a diagram showing another method to generate slice images in embodiment 1.

FIG. 4 shows another method for generating slice images. In this example, a predetermined range $\Delta h$ is set for the height of a horizontal plane at which the slice image is generated and a region deemed to exist in this range is left whereas the other region is made transparent. Although the range $\Delta h$ is shown only about the horizontal plane C in FIG. 4, this applies also to the other horizontal planes. As a result, the region at a position higher than the range of each horizontal plane is also made transparent. Thus, compared with FIG. 2, the object in slice images 166 and 168 in FIG. 4 is represented as a hollow object. Also when this is employed, the side surface of the object can be represented by stacking the slice images and therefore an image with a stereoscopic effect can be displayed similarly. In this case, the stacking interval is so adjusted that the hollow part becomes inconspicuous.

Figure 5:
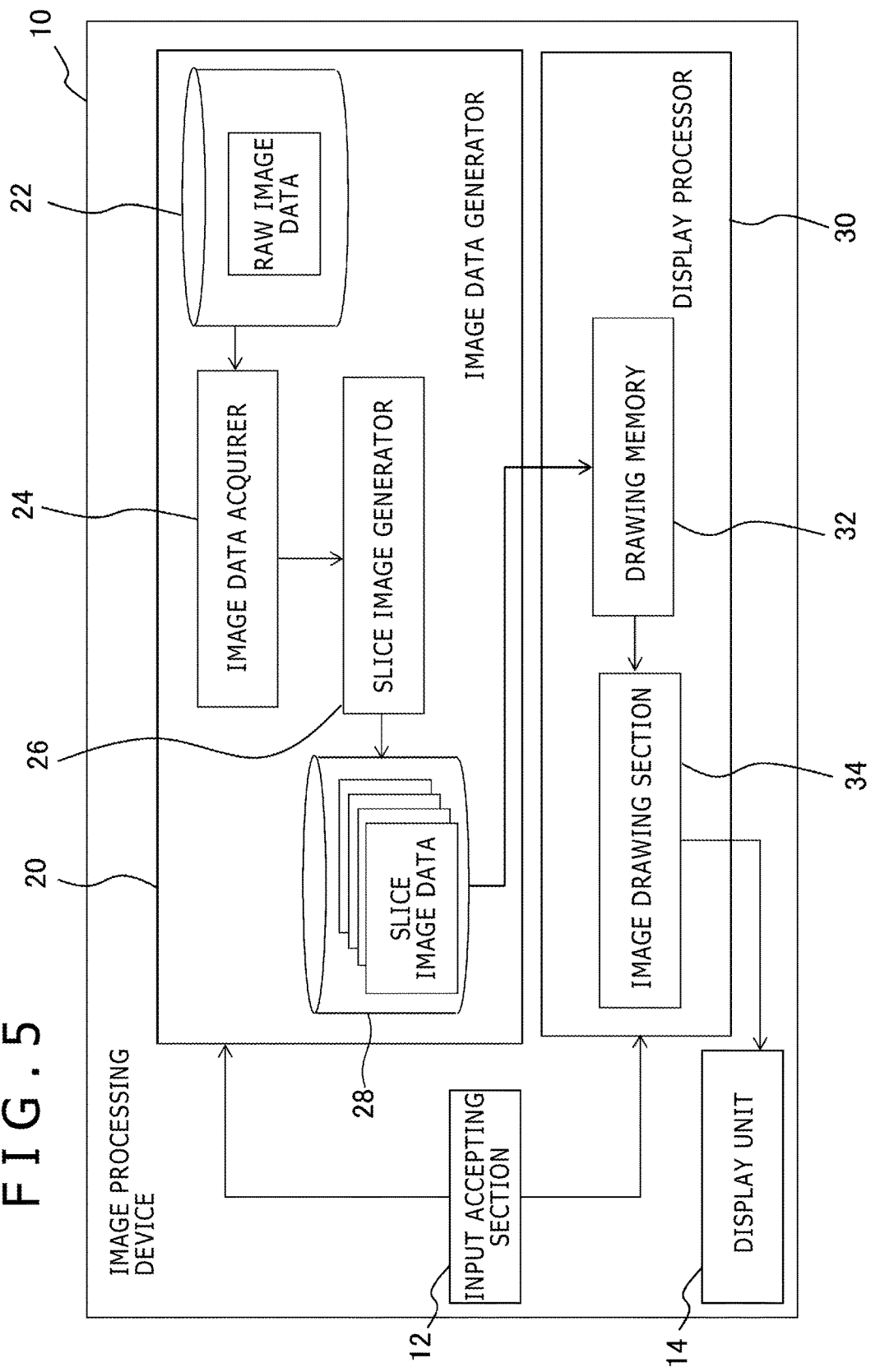
FIG. 5 is a diagram showing the configuration of an image processing device of embodiment 1 in detail.
Figure 19:
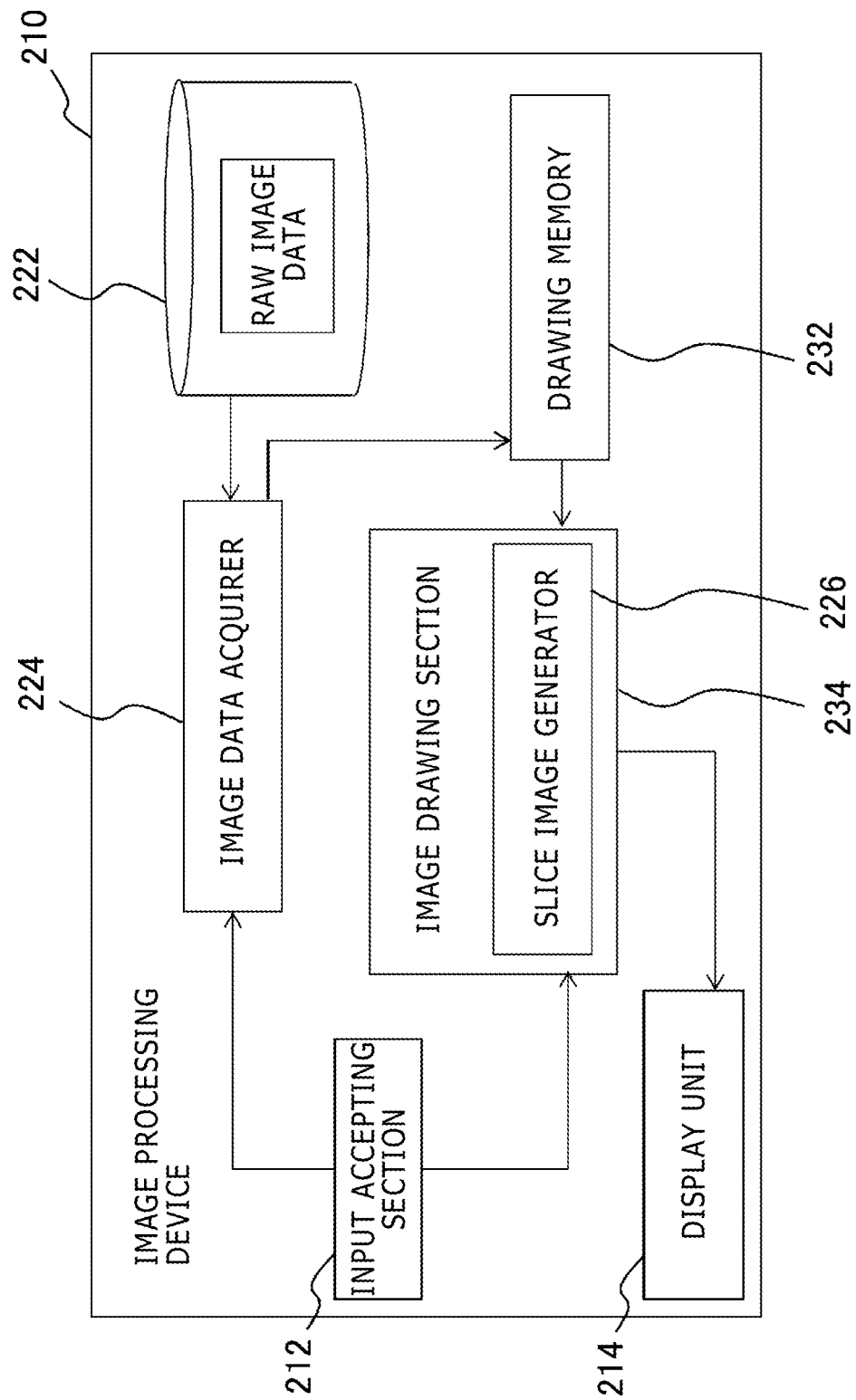
FIG. 19 is a diagram showing another configuration example of the image processing device in embodiment 1.
Figure 23:
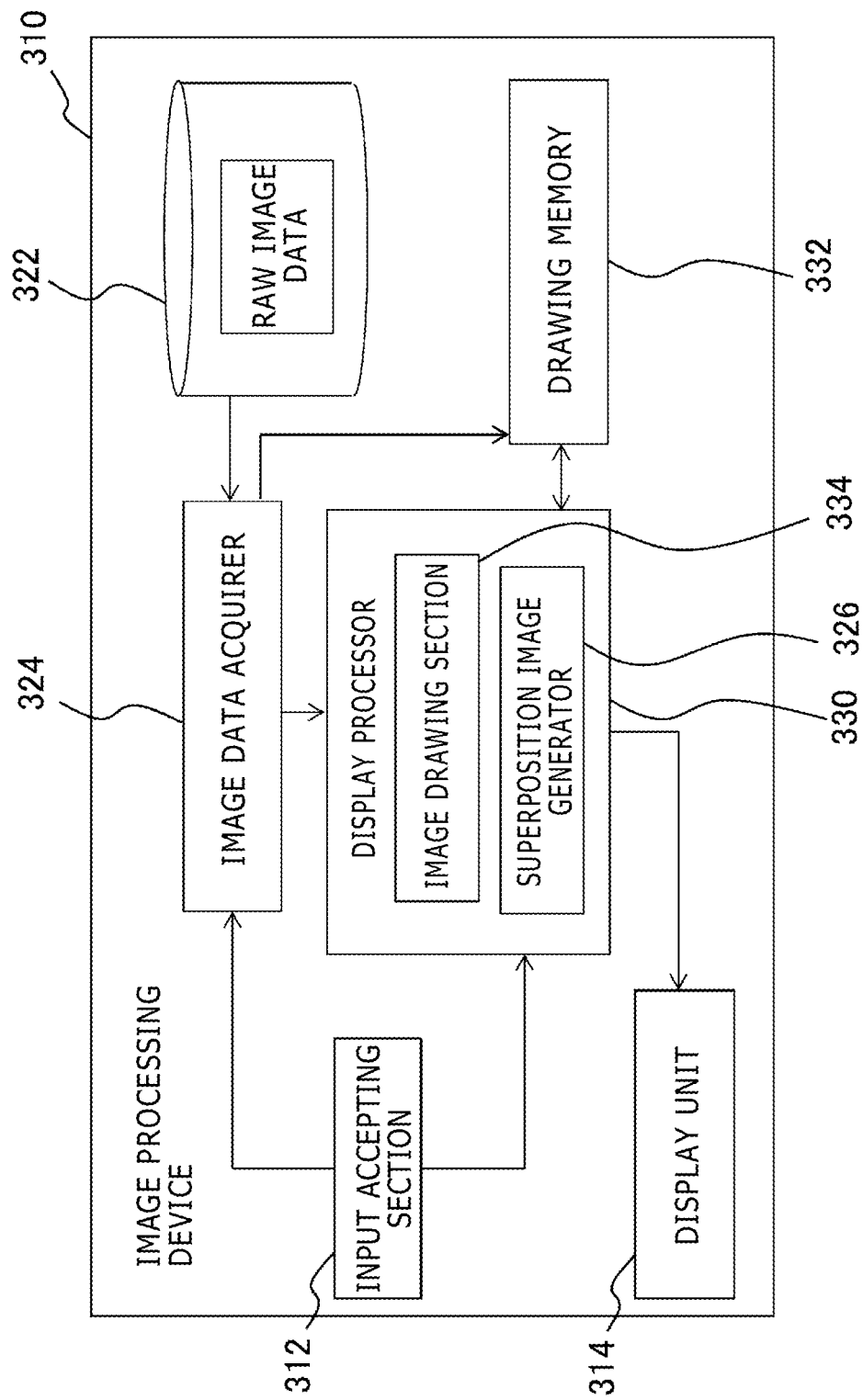
FIG. 23 is a diagram showing the configuration of an image processing device in embodiment 2.

FIG. 5 shows the configuration of an image processing device of the present embodiment in detail. In FIG. 5 and FIGS. 19 and 23 to be described later, the respective elements described as functional blocks that execute various kinds of processing can be configured by CPU (Central Processing Unit), GPU (Graphics Porcessing Unit), memory, and other LSIs in terms of hardware, and are implemented by a program that executes image processing and so forth in terms of software. Therefore, it is understood by those skilled in the art that these functional blocks can be implemented in various forms by only hardware, only software, or a combination of them, and they are not limited to any.

An image processing device 10 includes an image data generator 20 that generates a set of slice images from an original two-dimensional image, a display processor 30 that draws an image with a stereoscopic effect by using the slice images, an input accepting section 12 that acquires an instruction to generate image data and an instruction to display an image from a user, and a display unit 14 that displays an image. Processing executed by the image data generator 20 and processing executed by the display processor 30 can be independently carried out. Therefore, instead of providing both in the same device, they may be formed as individual devices having the individual functions. Furthermore, in the image processing device 10, functions of game, content displaying, and various kinds of information processing into which an image display technique to be described below is incorporated may be included. However, description thereof is omitted because a general technique can be applied thereto.

The input accepting section 12 accepts, from a user, instruction input of start of image data generation processing, selection of an image of the processing target, condition setting, and so forth and notifies it to the image data generator 20. Moreover, the input accepting section 12 accepts instruction input of start and end of image displaying, movement of the point of sight, and so forth from the user and notifies it to the display processor 30. The input accepting section 12 may be any of general input devices such as mouse, keyboard, controller, and joystick or may be a touch panel or the like mounted on the screen of the display unit 14. The display unit 14 may be a display device that displays an image as a single unit, such as a liquid crystal display or a plasma display, or may be a combination of a projector that projects an image and a screen, or the like.

The image data generator 20 includes an image data acquirer 24 that acquires data of a raw image of the processing target, a slice image generator 26 that generates slice images from the data of the raw image, a raw image data storage 22 in which the data of the raw image is stored, and a slice image data storage 28 in which data of the generated slice images is stored. In the raw image data storage 22, data of an original two-dimensional image like the image 52 in FIG. 1 is stored. This image may be general image data in which pixels arranged in a two-dimensional plane each have color information. Here, the color system of the color information is RGB, YCbCr, etc. and is not particularly limited.

In the raw image data storage 22, data of height information corresponding to a raw image may be further stored. Here, the height information is information that represents the heights of objects expressed in the raw image in association with positions in the image plane of this image. For example, when an aerial photograph is employed as a raw image, topographic height information of the land in the photograph is separately acquired to be stored. Alternatively, a photograph obtained by shooting an object may be employed as a raw image and be stored in association with height information obtained as a result of measuring this object by laser irradiation or the like. Besides, measures to acquire the height information are not particularly limited. Furthermore, the interval of the position about which data of the height is held and the scale of the height are also not limited. However, as described later, the height information is not essential in the present embodiment.

The image data acquirer 24 acquires data of a raw image from the raw image data storage 22 in accordance with an instruction from a user accepted by the input accepting section 12. If data of height information associated with it is stored in the raw image data storage 22, the image data acquirer 24 also reads out it. The image data acquirer 24 may acquire either or both of the data of the raw image and the data of the height information from a server connected via a network or an image input device such as a camera (neither is shown in the diagram).

The slice image generator 26 generates slice images based on the data acquired by the image data acquirer 24. The principle of the generation of the slice images is as described above and a specific example will be described in detail later. Data of the generated slice images is stored in the slice image data storage 28 in association with identification information of the slice planes. In plural slice images generated from one raw image, color information except the alpha channel is the same as the raw image. Therefore, the data stored in the slice image data storage 28 may be a set of data of the raw image having the color information and data of plural alpha images holding only the alpha value of each slice image as a pixel value. Alternatively, only a set of the data of the alpha images may be stored after being associated with the data of the raw image. In either case, the data of the raw image and the alpha images are read out at the stage of displaying and the color information and the alpha value are combined to complete the individual slice images and thereafter stack them.

The display processor 30 includes a drawing memory 32 in which the data of images necessary for drawing are sequentially stored and an image drawing section 34 that draws an image with a stereoscopic effect by using data of slice images. The image drawing section 34 acquires instruction input of start of displaying, movement of the point of sight, and so forth accepted by the input accepting section 12 and reads out data of slice images to be used for displaying from the slice image data storage 28 into the drawing memory 32. In the case of immediately displaying an image from slice images generated by the image data generator 20, the slice image data storage 28 may serve also as the drawing memory 32.

The image drawing section 34 then projects, onto screen coordinates, the data of the slice images read out into the drawing memory 32 in order of slice planes or in order of decreasing distance from the point of sight to thereby make them overlap with each other and draw a display image. In the slice images, the part at which the object is absent is made transparent as described above. Therefore, the alpha channel is included in the pixel value. For this reason, the image drawing section 34 makes the slice images overlap by alpha blending processing. By executing this overlapping processing about each point of sight, image displaying with a stereoscopic effect can be implemented according to the movement of the point of sight. The image drawing section 34 may implement stereoscopic vision by executing similar object drawing processing about plural points of sight. The relative positions and so forth of the points of sight in this case can be appropriately decided according to the introduced system of the stereoscopic vision.

Figure 6:
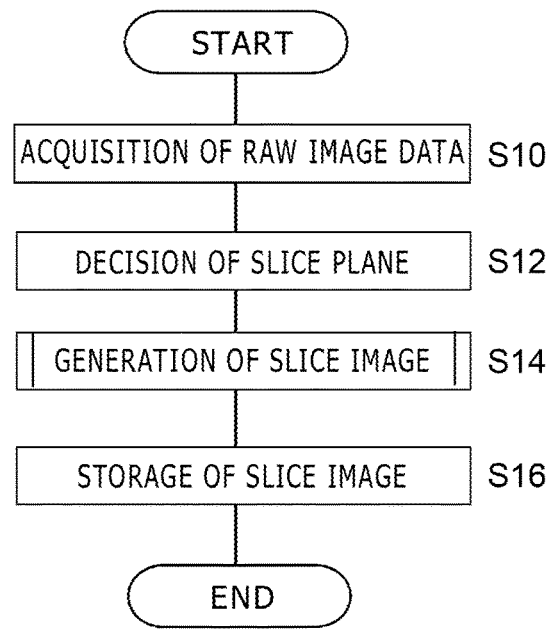
FIG. 6 is a flowchart showing the procedure of processing in which an image data generator generates data of slice images in embodiment 1.

Next, the operation of the image processing device 10 that can be implemented by the above-described configuration will be described. FIG. 6 is a flowchart showing the procedure of processing in which the image data generator 20 generates data of slice images. This flowchart is started when a user specifies a raw image and makes an input of an instruction to start generation processing of slice images. First, the image data acquirer 24 reads out data of the specified raw image from the raw image data storage 22 (S10). At this time, if data of height information associated with the raw image data is present, the image data acquirer 24 also reads out it. The image data acquirer 24 may acquire various kinds of data by accessing a server as described above.

Next, the slice image generator 26 decides slice planes based on the data of the raw image or the height information acquired by the image data acquirer 24. First, the slice image generator 26 decides the number, density, interval, and so forth of slice planes based on the above-described variation range of the point of sight, properties of objects, the distribution of height, and so forth and thereafter decides the specific positions of the slice planes. In the case of using the height information, the heights of the slice planes can be directly set. This corresponds to directly setting the positions of the horizontal planes A, B, and C in FIG. 2 for example.

On the other hand, if the height information is not used, the slice image generator 26 indirectly decides slice planes by using a parameter in the raw image expected to have a correspondence relationship with the height. For example, it will be possible to use the luminance of the raw image, the frequency, the grayscale of a predetermined color, etc. A parameter having a tendency to change depending on change in the height may be flexibly selected according to the contents of the image and so forth. Furthermore, the slice image generator 26 indirectly decides the heights of the slice planes by setting thresholds in this parameter.

The slice image generator 26 then generates slice images about the decided slice planes (S14). Specifically, as described above, the color information of the region that reaches the height of the slice plane decided in S12 or the threshold set in the alternative parameter of the height, such as the luminance, is left as it is whereas the other region is made transparent. The generated slice images are stored in the slice image data storage 28 (S16).

Figure 7:
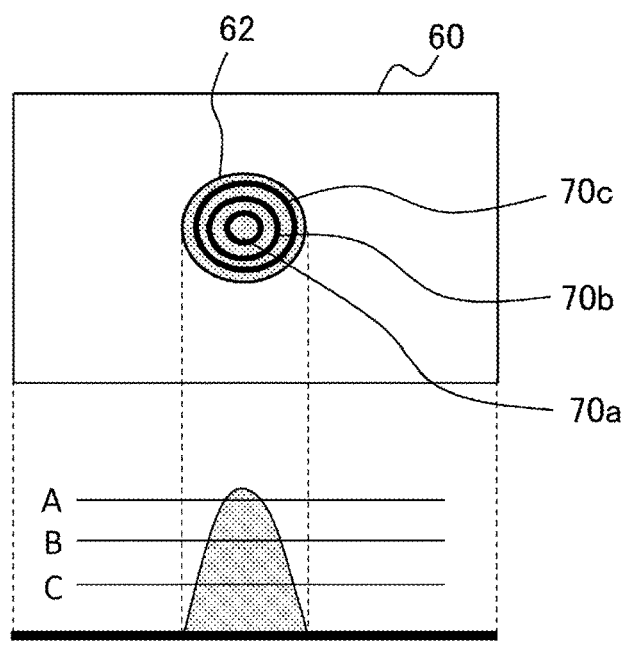
FIG. 7 is a diagram showing how slice images are generated from a raw image in embodiment 1.

Next, a description will be made about a method for generating slice images about decided slice planes when height information is obtained. FIG. 7 shows how slice images are generated from the raw image 60 in FIG. 2 with use of the horizontal planes A, B, and C as slice planes. When height information is obtained, contour lines 70*a*, 70*b*, and 70*c* corresponding to the heights of the horizontal planes A, B, and C can be drawn on the raw image 60 as shown in the diagram.

The region that reaches the horizontal plane C in the raw image 60 is the region inside the contour line 70*c*. Therefore, an image obtained by setting the alpha value of this region to 1 and setting the alpha value of the other region to 0 is employed as the slice image generated with use of the horizontal plane C as the slice plane. Similarly, the slice image generated with use of the horizontal plane B as the slice plane is an image obtained by setting the alpha value of the region inside the contour line 70*b* to 1 and setting the alpha value of the other region to 0. The slice image generated with use of the horizontal plane A as the slice plane is an image obtained by setting the alpha value of the region inside the contour line 70*a* to 1 and setting the alpha value of the other region to 0. These slice images are nothing less than the images 68, 66, and 64 in FIG. 2. Although the contour lines are closed curves in the example of this diagram, the processing is similar also with an open curve that reaches an image end.

Figure 8:
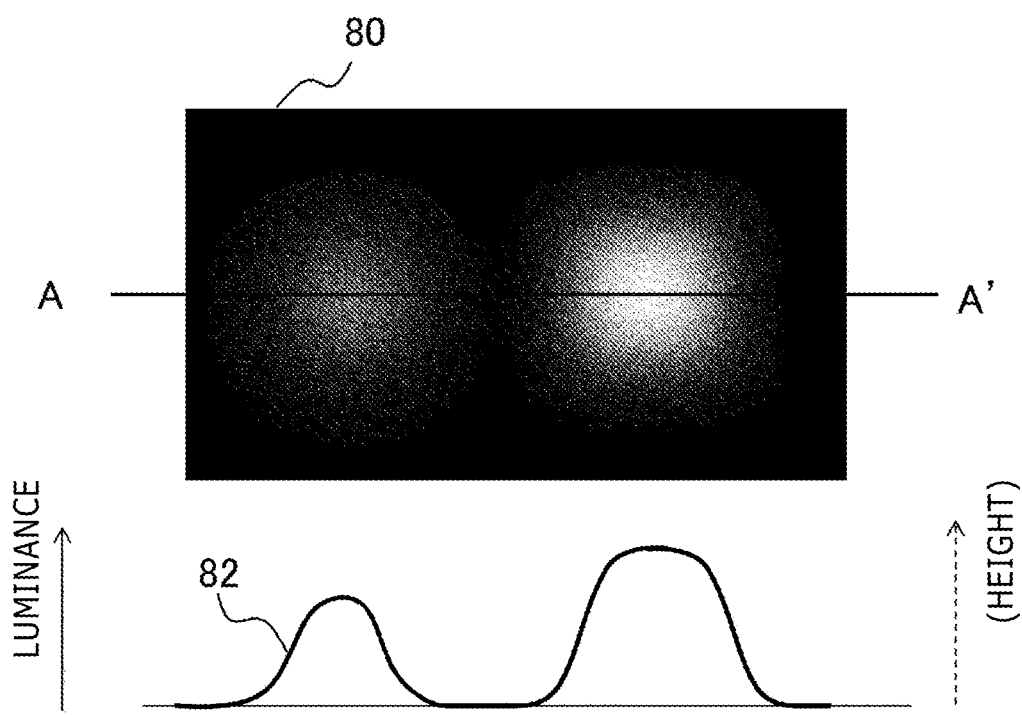
FIG. 8 is a diagram for explaining the principle of indirectly setting slice planes based on the luminance in embodiment 1.

FIG. 8 is a diagram for explaining the principle of indirectly setting slice planes based on the luminance. The processing is similar also with the frequency, the grayscale of a predetermined color, etc. An image on this diagram is a raw image 80 and two regions with high luminance exist on the left and right sides. The luminance on line AA' traversing the raw image 80 changes as shown by a curve 82. In general, when an object with concavities and convexities is looked down upon, light shines on the protruding parts whereas light reaches the hollow parts less easily. When this general tendency is used, it can be estimated that the height of the region with high luminance in the raw image 80 as an overhead image is high and the height of the region with low luminance is low.

Figure 9:
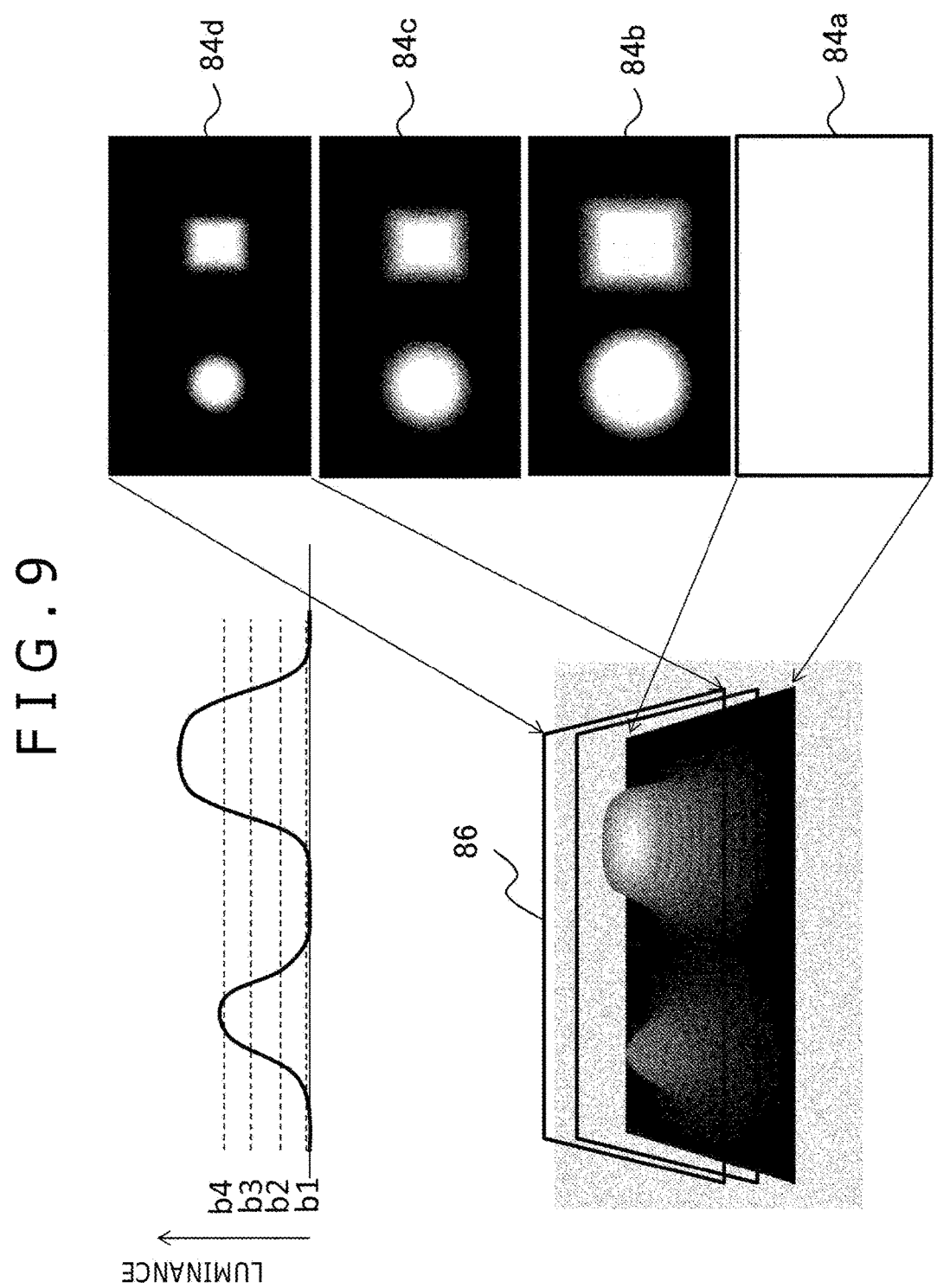
FIG. 9 is a diagram showing an example of slice images generated by using the luminance in embodiment 1.

Therefore, slice planes are indirectly set by setting thresholds in the luminance as an alternative parameter of the height and slice images are generated. FIG. 9 shows an example of the slice images generated from the raw image 80 in FIG. 8 by using the luminance. Here, images 84*a*, 84*b*, 84*c*, and 84*d* show only the alpha value of the slice image. The region in which the original color information is left in the slice image has 1 as the alpha value and therefore is represented by white in the images 84*a*, 84*b*, 84*c*, and 84*d*. The other region, i.e. the region made transparent, has 0 as the alpha value and therefore is represented by black.

As shown on the upper left side of this diagram, thresholds b1, b2, b3, and b4 (b1<b2<b3<b4) are set in the luminance. Here, b1 is defined as the lowest luminance in the raw image. Furthermore, in the image 84*a* of the lowermost layer, the region in which the luminance is equal to or higher than b1 is left. In the image 84*b* over it, the region in which the luminance is equal to or higher than b2 is left. In the image 84*c* over it, the region in which the luminance is equal to or higher than b3 is left. In the image 84*d* of the uppermost layer, the region in which the luminance is equal to or higher than b4 is left. In each of these images, the alpha value of the other region is set to 0. By defining b1 as the lowest luminance in the raw image here, the alpha value of all pixels in the image 84*a* of the lowermost layer becomes 1 and the raw image 80 as the base can be displayed without a missing part.

In this manner, by the threshold determination about the luminance of each pixel, the alpha channel of the slice image corresponding to each threshold is decided. Then, the alpha channel is integrated with the color information of the raw image to generate the final slice images. When the plural generated slice images are sequentially stacked from the lowermost layer at predetermined intervals, a three-dimensional object 86 in which the luminance is reflected in the height can be generated. As shown in the images 84*b*, 84*c*, and 84*d*, instead of setting the alpha value to the binary value of 1 or 0, the alpha value may be interpolated at the boundary between regions so that the region in which the color information is left may smoothly connect to the region made transparent. In this case, the alpha value to be interpolated may be decided according to the difference between the threshold and the luminance.

Figure 10:
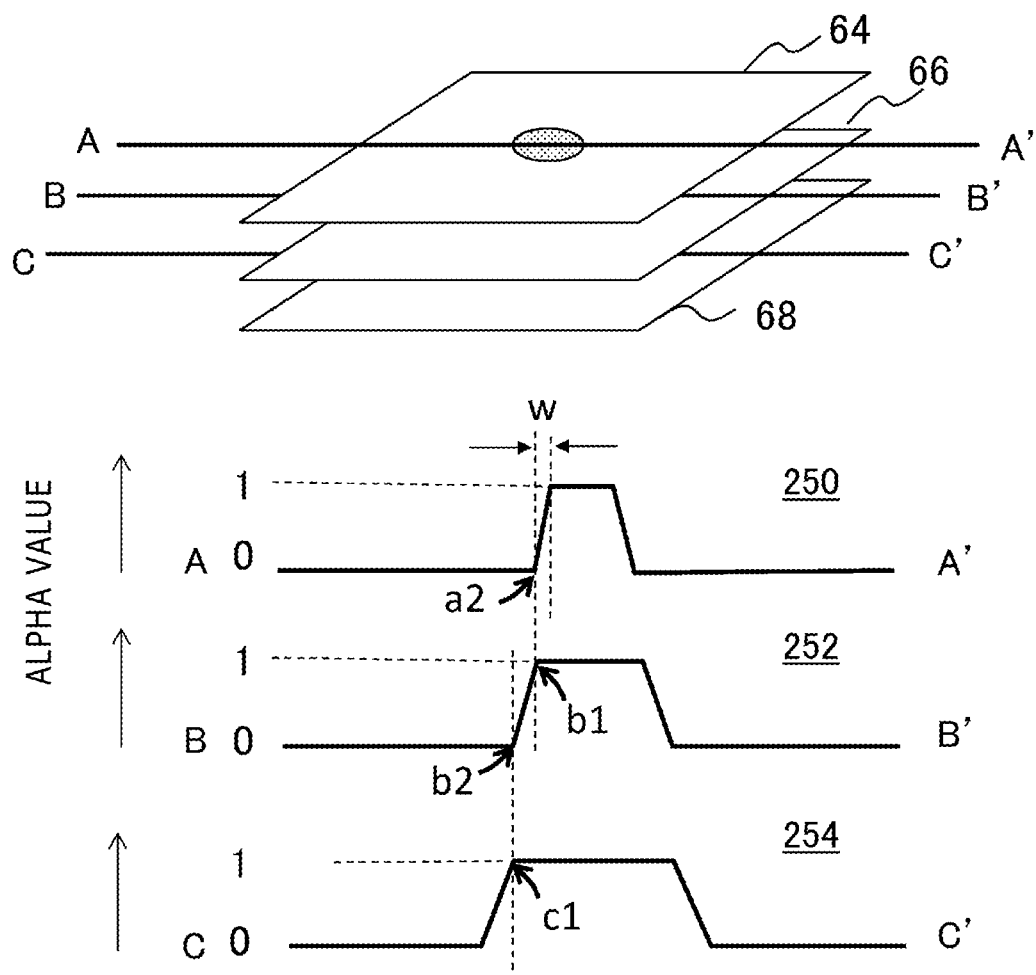
FIG. 10 is a diagram schematically showing distributions of the alpha value of slice images when the alpha value is interpolated at the boundary between regions in embodiment 1.

FIG. 10 schematically shows distributions of the alpha value of slice images when the alpha value is interpolated at the boundary between the regions. In this diagram, the distributions of the alpha value on straight lines AA', BB', and CC' each passing through the image of the object in the slice images 64, 66, and 68 in FIG. 2 as shown on the upper stage is shown on the lower stage. The distributions of the alpha value of the slice images 64, 66, and 68 are distributions 250, 252, and 254. When the distribution 250 is taken as an example, the alpha value of the region of the image of the object in which the luminance is equal to or higher than a threshold is basically 1 and the alpha value of the other region is 0. However, in a region with a width w as the boundary region of these regions, the alpha value is so interpolated as to change from 0 to 1. The boundary region may be set outside the region in which the luminance is equal to or higher than a threshold or may be set inside. Alternatively, it may be so set that the center axis of the boundary region overlaps with the boundary line.

The rules for setting the width w of the boundary region and the method for interpolating the alpha value are prescribed in advance. At this time, if the boundary region is so set that the position, on the image plane, of the outer circumference of the boundary region in a certain slice image corresponds with the position of the inner circumference of the boundary region in a slice image of the next lower layer, the boundary regions about one object are continuous between the slice images and the inclination of the side surface can be expressed more smoothly. In the example of FIG. 10, the position a2 of the outer circumference of the boundary region in the distribution 250 of the slice image 64 corresponds with the position b1 of the inner circumference of the boundary region in the distribution 252 of the slice image 66 under it. The position b2 of the outer circumference of the boundary region in this distribution 252 corresponds with the position c1 of the inner circumference of the boundary region in the distribution 254 of the slice image 68 under it.

Figure 11:
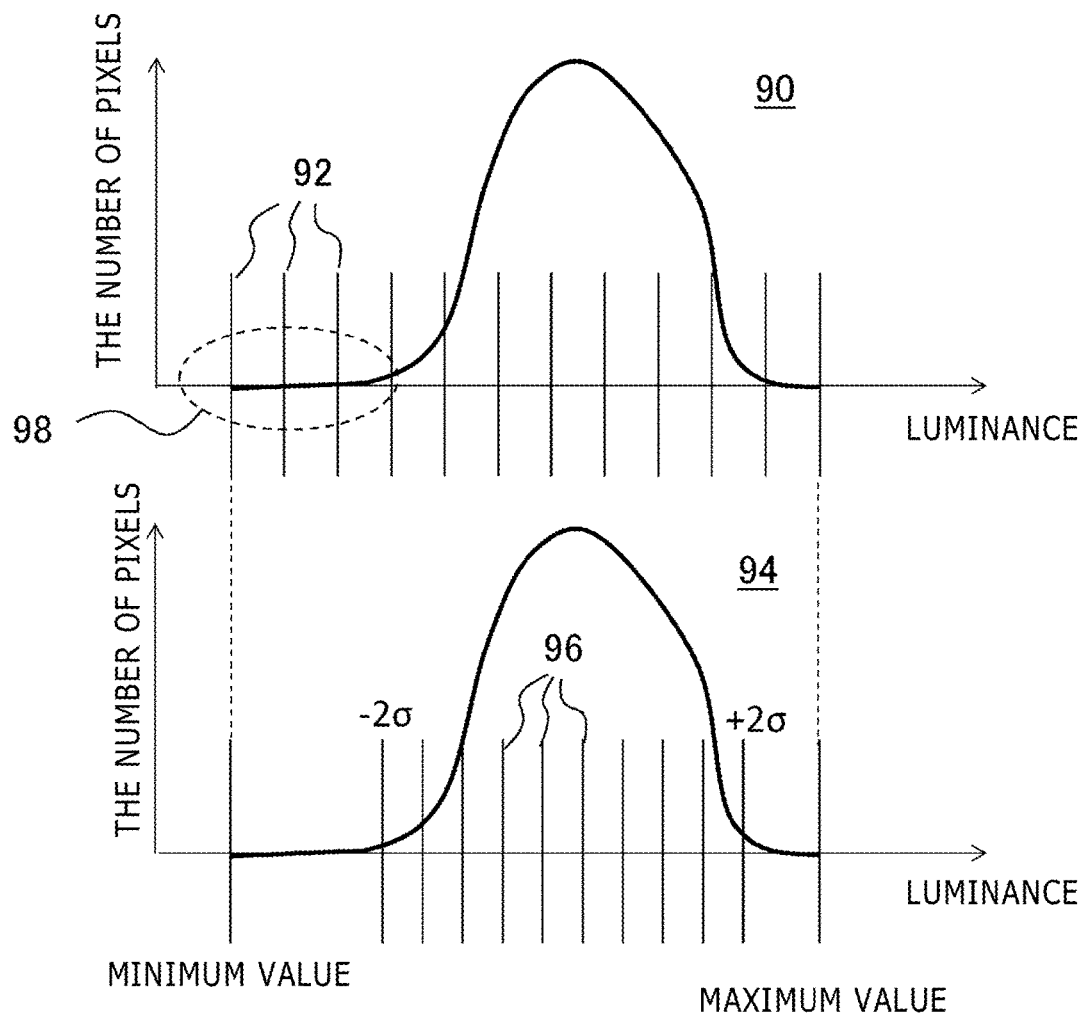
FIG. 11 is a diagram for explaining a method in which the interval of thresholds is changed to make displaying efficient in embodiment 1.

In the example of FIG. 9, the thresholds are set about the luminance at equal intervals. In this case, for example, the minimum value and maximum value of the luminance are obtained in the raw image and boundary values obtained when evenly dividing them are employed as the thresholds. On the other hand, the thresholds do not have to be set at equal intervals. FIG. 11 is a diagram for explaining a method in which the interval of the thresholds is changed to make displaying efficient. Graphs in this diagram both show change in the number of pixels with respect to the luminance, obtained as a result of tallying up the luminance of each pixel in a certain raw image. Furthermore, thresholds set by two types of threshold setting methods 90 and 94 (e.g. thresholds 92 and 96) are each represented by a vertical line shown on the axis of the luminance.

First, in the threshold setting method 90, as described above, the region between the maximum value and minimum value of the luminance is evenly divided and the boundary values are employed as the thresholds 92. In this case, the load of processing for the threshold setting is light. On the other hand, similar slice images are generated about the plural thresholds 92 in the low-luminance region and the high-luminance region (e.g. region 98) in which the number of pixels does not greatly change in response to change in the luminance value, so that the efficiency is low in some cases. In the threshold setting method 94, in consideration of this point, the thresholds are set by statistical processing about the luminance.

Specifically, the standard deviation $\sigma$ of the luminance is obtained and the boundary values obtained when the region between average values $+/-2\sigma$ is evenly divided are employed as the thresholds. If this is employed, the thresholds can be set with fine resolution of the major luminance zone in consideration of the luminance characteristics of each raw image. As a result, even with the same number of slice images as that in the threshold setting method 90, more information can be included therein. The values +/−2σ are merely an example and +/−σ, +/−3σ, etc. may be employed. Furthermore, thresholds may be set with low density also for the luminance that is not included in these zones.

Furthermore, instead of the even division, thresholds may be set with higher density in a region in which change in the number of pixels in response to change in the luminance is large. Moreover, in view of that this technique relies on the assumption that change in the luminance corresponds to change in the height, e.g. a scheme may be employed in which the luminance is associated with the height linearly or non-linearly in advance and luminance values corresponding to boundary values when the height is evenly divided are employed as thresholds.

Figure 12:
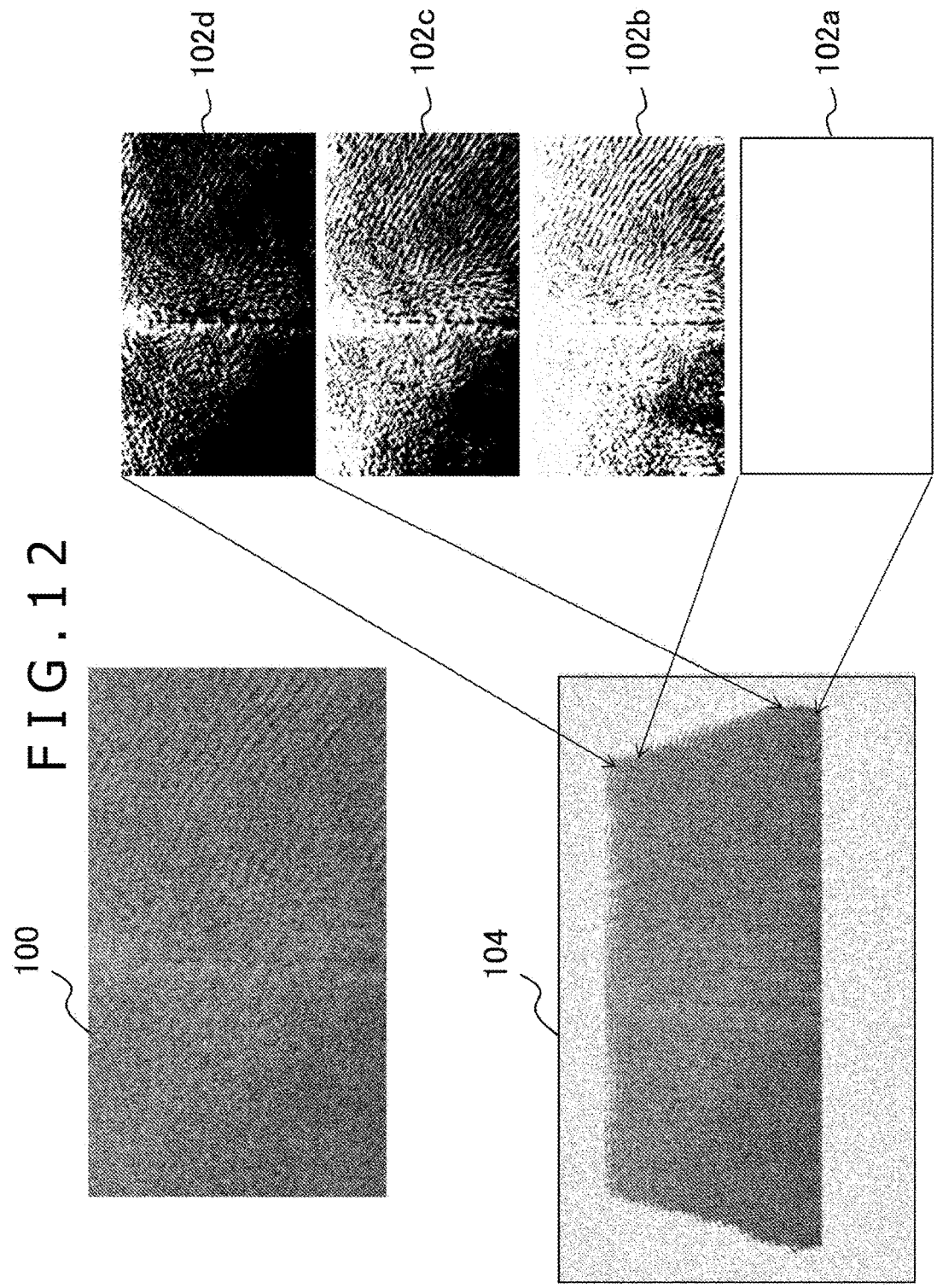
FIG. 12 is a diagram showing examples of images displayed based on an actual raw image in embodiment 1.

FIG. 12 shows examples of images displayed based on an actual raw image. A raw image 100 shown on the upper left side of this diagram is obtained by photographing the surface of a stuffed toy. In this image, fine concavities and convexities due to raised fabric are represented on a two-dimensional plane. On the other hand, examples of images of the alpha value of slice images generated by setting thresholds for luminance values by any of the above-described methods are images 102a, 102b, 102c, and 102d. As with the images shown in FIG. 9, the region left as the color information is smaller in the slice image of the upper layer.

When the slice images generated by combining such an alpha value with the color information of the raw image are stacked to draw an image as viewed from a point of sight on an oblique side, a stereoscopic image like a display image 104 can be displayed. The stereoscopic effect is accentuated in the display image 104 by setting the stacking interval somewhat wide. However, in fact, the stacking interval is so adjusted that a more natural stereoscopic effect is obtained. The region in which the color information is left based on the slice image can be so decided that one pixel is the minimum unit. Therefore, even an object having sharp tips such as hairs can be so expressed that the hairs are protruded one by one based on information included in the raw image, such as the contrast of the luminance. Due to this, compared even with a technique of expressing concavities and convexities on each region basis by using a polygon mesh, a stereoscopic effect of higher definition can be given to the display image.

Figure 13:
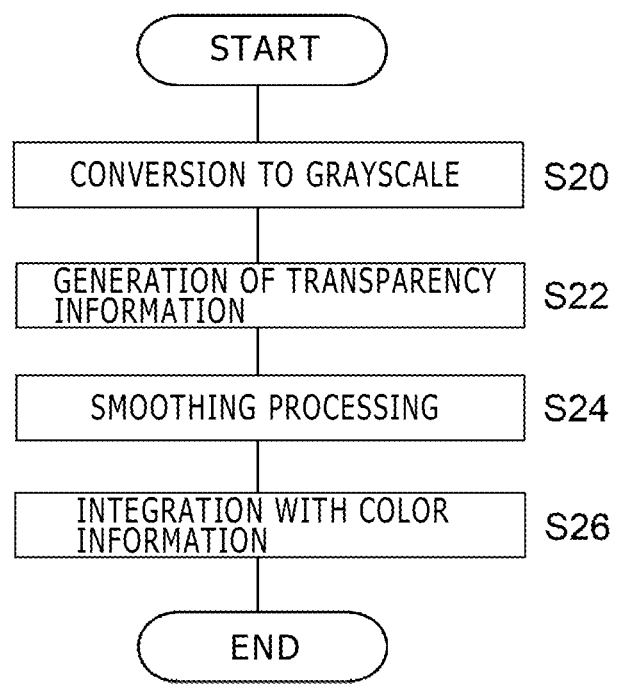
FIG. 13 is a flowchart showing the procedure of processing in which a slice image generator generates slice images based on the luminance in embodiment 1.

FIG. 13 is a flowchart showing the procedure of the processing in which the slice image generator 26 generates slice images based on the luminance in S14 in FIG. 6. First, in order to obtain the luminance of each pixel, a raw image of the processing target is converted to the grayscale (S20). Then, by comparison between plural thresholds of the luminance set in S12 in FIG. 6 and the respective pixel values, transparency information of the slice images corresponding to the respective thresholds is generated (S22). Specifically, the alpha value of the pixel having a pixel value equal to or larger than the threshold is set to 1 and the alpha value of the pixel having a pixel value smaller than the threshold is set to 0. Images of the alpha value like the images 102a, 102b, 102c, and 102d in FIG. 12 are thereby generated.

Next, the images of the alpha value are smoothed by using a general smoothing filter such as a Gaussian filter (S24). Alternatively, also when the alpha value is interpolated for each pixel according to the difference from the threshold, a similar filter effect is obtained. The boundaries between the region made transparent and the other region are thereby smoothly connected to prevent the boundary line between the transparent and non-transparent regions, i.e. the side surface of the object, from having an unnatural shape when the slice images are stacked. The images of the alpha value of the respective slice images generated in this manner are integrated with the color information possessed by the pixels of the raw image and thereby plural slice images having the alpha channel are generated (S26).

Figure 14:
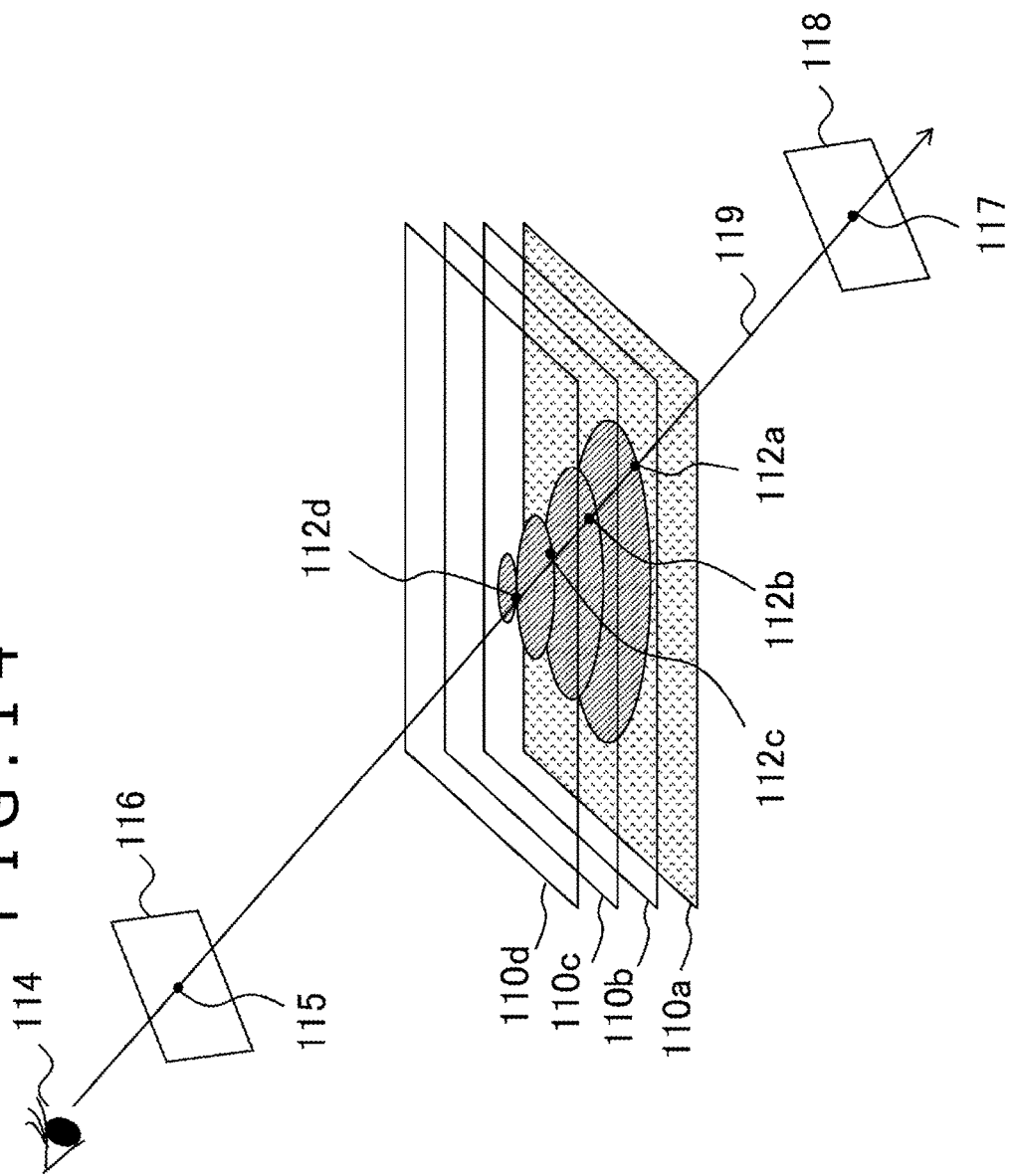
FIG. 14 is a diagram schematically showing how an image drawing section draws an image with a stereoscopic effect by using slice images in embodiment 1.

FIG. 14 schematically shows how the image drawing section 34 draws an image with a stereoscopic effect by using slice images. From the side farther from a point 114 of sight, a background 118, slice images 110a, 110b, 110c, and 110d, and a screen 116 are located. The slice image 110a is the same as a raw image. In this case, an image projected onto a certain point 115 on the screen 116 is one obtained by causing images at intersections 117, 112a, 112b, 112c, and 112d between a line 119 of sight passing through the point 114 of sight and the point 115 and the background 118 and the slice images 110a, 110b, 110c, and 110d to be overlapped with each other from the side farther from the point 114 of sight.

Figure 15:
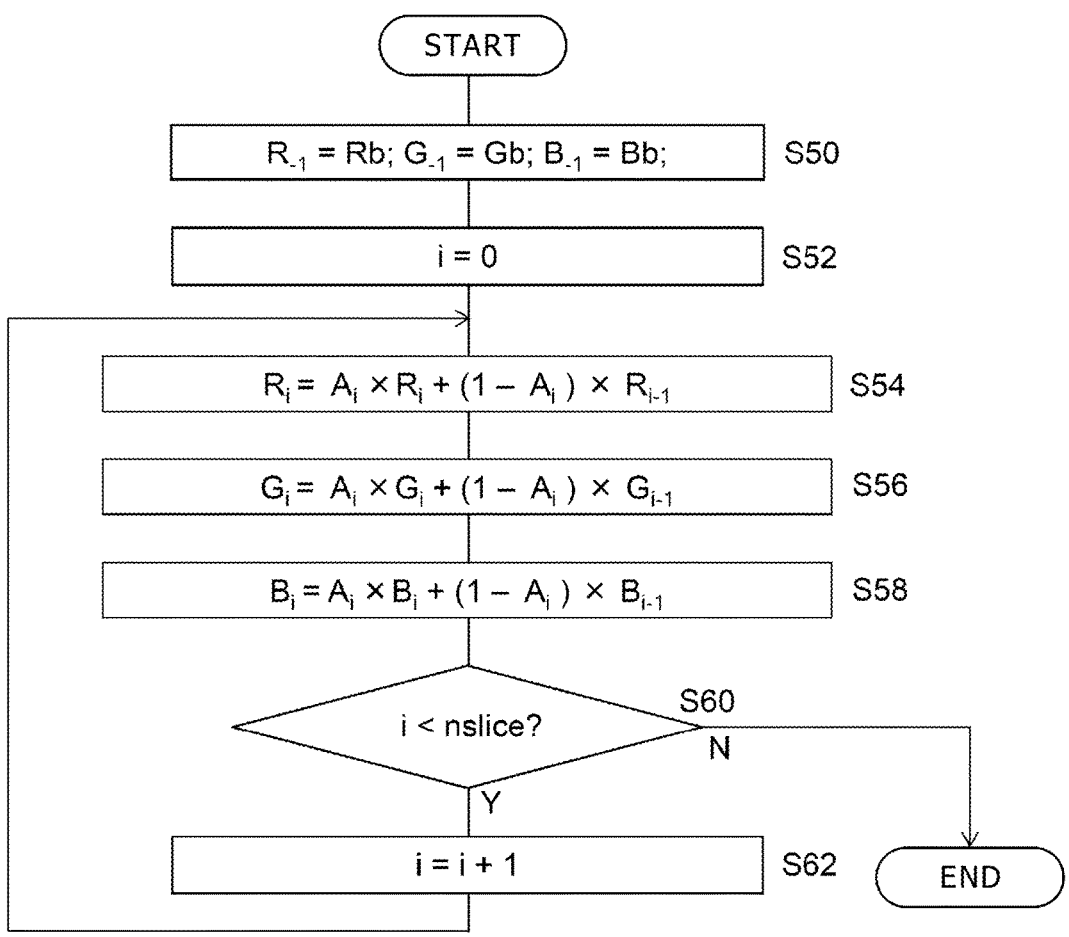
FIG. 15 is a flowchart showing the procedure of processing of obtaining RGB values at a point on a screen in embodiment 1.

FIG. 15 is a flowchart showing the procedure of processing of obtaining RGB values at the point 115 on the screen shown in FIG. 14. First, variables $R_i$, $G_i$, and $B_i$ (i is an integer equal to or larger than −1) are prepared and RGB values at the intersection 117 of the background 118, Rb, Gb, and Bb are substituted into $R_{-1}$, $G_{-1}$, and $B_{-1}$ (S50). If the RGB values and the alpha value at the intersection 112a on the slice image 110a farthest from the point of sight are defined as ($R_0$, $G_0$, $B_0$, $A_0$), the RGB values become the following values when the intersection 117 of the background 118 is overlapped with the intersection 112a on the slice image 110a (S52, S54, S56, S58).

$R=A_0 \times R_0+(1-A_0) \times R_{-1}$ $G=A_0 \times G_0+(1-A_0) \times G_{-1}$ $B=A_0 \times B_0+(1-A_0) \times B_{-1}$ (expression 1)

The above-described calculation is so repeated that R, G, and B of the above expression are employed as new $R_0$, $G_0$, and $B_0$ and i is incremented, in such a direction as to get closer to the point of sight until the intersection of the last slice image (i=nslice−1) (Y of S60, S62, S54, S56, S58). RGB values resulting from overlapping of all intersections of the nslice slice images with each other are thereby obtained (N of S60).

Figure 16:
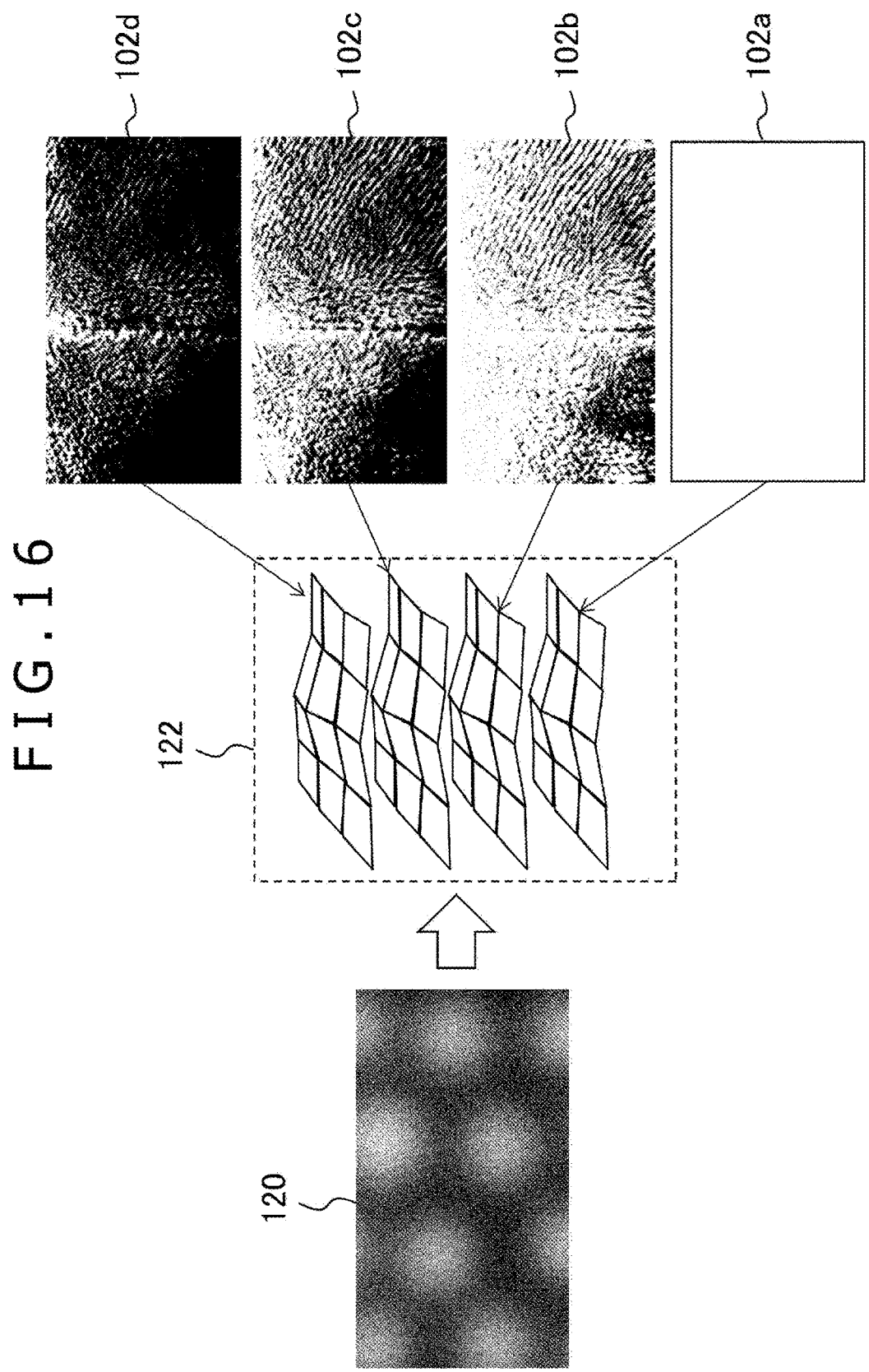
FIG. 16 is a diagram for explaining a mode in which polygon meshes are introduced in embodiment 1.

According to the above-described method, giving a stereoscopic effect to an image in units of pixel is enabled by generating slice images. Therefore, the method is particularly effective for displaying of an image that represents an object having fine concavities and convexities. If a polygon mesh is further used, combination with concavity-and-convexity expression in a larger unit is possible. FIG. 16 is a diagram for explaining a mode in which polygon meshes are introduced by using height information acquired in association with image data. An image 120 on the left side of this diagram is an image in which the distribution of the height at each position in a raw image is represented as the luminance distribution.

The height does not need to be obtained in units of pixel and it is enough that the height is obtained at least for each polygon mesh to be formed. Furthermore, the image plane is resolved into a predetermined mesh and the mesh is given concavities and convexities according to the height to thereby generate a polygon mesh 122. This polygon mesh is generated for the number of slice images and the slice images having the images 102a to 102d as the alpha value are attached to the respective polygon meshes. Then, the polygon meshes are stacked to draw a display image. In this diagram, the polygon meshes are so shown that the interval between the stacked polygon meshes is set large for facilitation of understanding. However, in fact, they are brought close to each other as with the case in which the polygon meshes are not introduced.

In this manner, concavities and convexities are formed in the slice image itself by the polygon mesh. Thereby, for example in an aerial photograph, fine concavities and convexities due to buildings, trees, etc. can be expressed by stacking of slice images and concavities and convexities with large areas, such as mountains and valleys, can be expressed by the concavities and convexities of the slice image itself. In the case of setting slice planes based on the luminance, a region in which the luminance is low as a whole, such as a mountain terrain, is left in a slice image of a high layer less readily and there is a possibility that this region is expressed as a low region in a display image as a result. Introducing the polygon mesh can prevent the region that should be stereoscopically expressed from being unnaturally flat as above.

In this mode, images obtained by attaching slice images to polygon meshes by the slice image generator 26 are stored in the slice image data storage 28 as final slice images. Alternatively, only information relating to the shapes of polygon meshes may be stored in the slice image data storage 28 together with data of flat slice images and the image drawing section 34 may attach them at the stage of drawing.

FIG. 17 shows effects caused by introduction of slice images and introduction of polygon meshes through comparison of display images when image displaying with change in the point of sight is performed by using the raw image 100 in FIG. 12. A display image 124 is a display image when only the raw image 100 is drawn without introducing the polygon meshes. A display image 125 is a display image when drawing is performed by stacking the slice images without introducing the polygon meshes. A display image 126 is a display image when only the raw image 100 is drawn with introduction of the polygon mesh. A display image 128 is a display image when drawing is performed by stacking the slice images and introducing the polygon meshes. The display image 125 is an image obtained by adjusting the stacking interval of the display image 104 shown in FIG. 12.

Compared with the display image 124 obtained with introduction of neither the slice images nor the polygon meshes, in the display image 125, a texture of raised fabric of the surface can be expressed more favorably by introducing the slice images. In the display image 128 obtained by further introducing the polygon meshes, overall undulation as well as fine concavities and convexities of the raised fabric can be simultaneously expressed. Also when comparison is made with the display image 126 obtained by introducing only the polygon mesh without introducing the slice images, it can be understood that the texture of the surface is expressed more stereoscopically.

As described above, particularly in an aerial photograph or the like, due to the mixture of objects having different characteristics, such as mountains and urban areas, regions in which the luminance is high as a whole and regions in which the luminance is low are included in one image in some cases. That is, variation often arises in the luminance characteristics depending on the region. In this case, if the threshold of the luminance is set as a common value in the image, the region of low luminance tends to be flatly expressed even when the height is large obviously. Conversely, the region of high luminance tends to be stereoscopically expressed even when the height is small. As another method for overcoming this problem, changing the threshold from region to region will be available.

Figure 18:
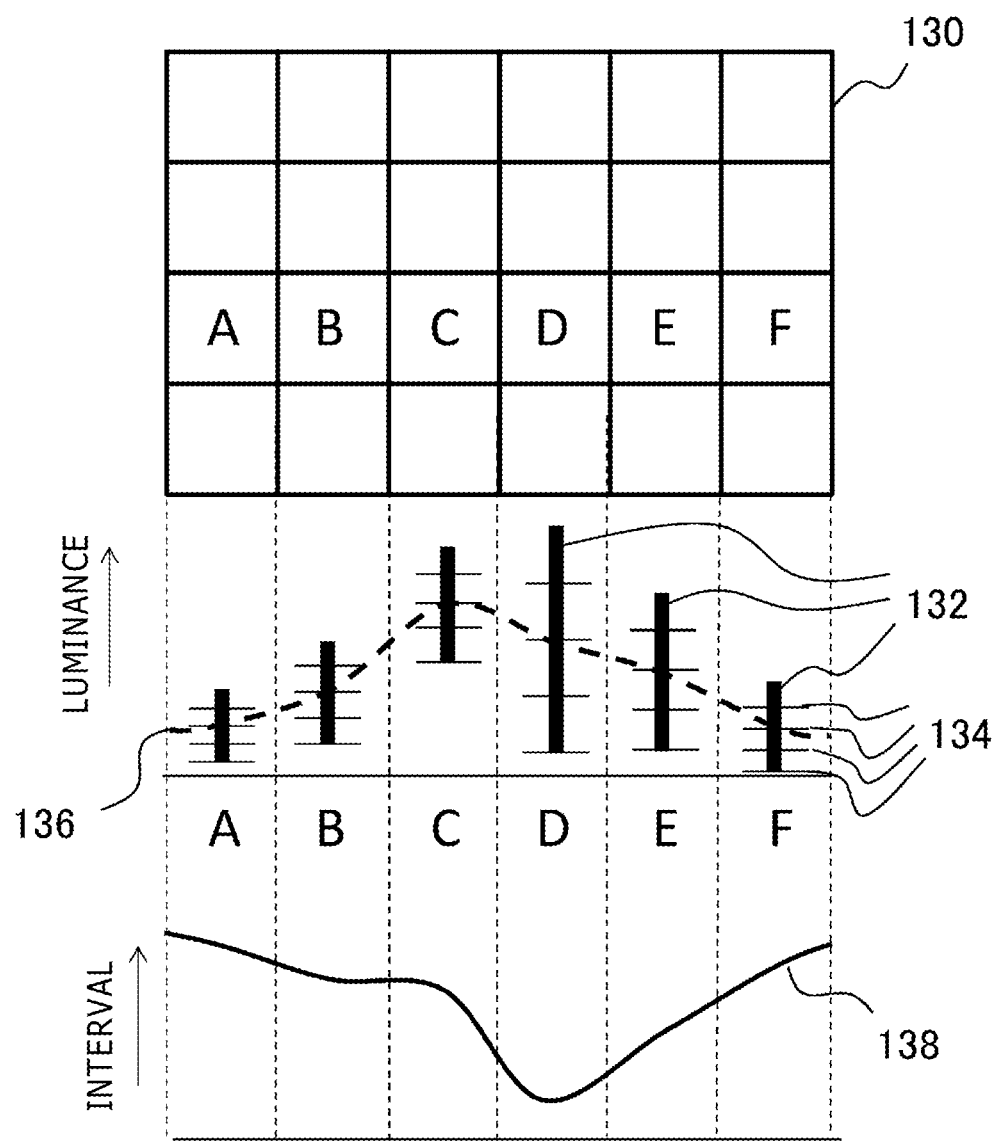
FIG. 18 is a diagram for explaining a method in which the threshold of the luminance is changed from region to region in embodiment 1.

FIG. 18 is a diagram for explaining the method in which the threshold of the luminance is changed from region to region. As shown in this diagram, luminance distribution zones 132 obtained by dividing a raw image 130 into blocks and tallying up the luminance for each block are represented by thick lines about blocks A, B, C, D, E, and F. Thresholds 134 are set individually for each of such luminance distribution zones 132. If this is employed, even when the absolute value of the luminance involves a bias depending on the region, expression of the height depending on this bias can be prevented. Furthermore, it is possible to prevent a situation in which luminance change of a region of low luminance is absorbed due to the existence of a region with large change in the luminance and is not reflected in a slice image and a situation in which the height of a region of high luminance unnaturally increases.

In the example of FIG. 18, the luminance zone of each block is evenly divided and the respective thresholds 134 are set. However, this does not intend to limit the configuration thereto. For example, the standard deviation of the luminance may be calculated for each block and thresholds may be set near the average value of the luminance in a focused manner as described with FIG. 11. Furthermore, the block division of the raw image does not have to be even.

After the thresholds are set for each block in this manner, a threshold determination is made about the luminance of each pixel in the block and the region in which the color information is left and the region made transparent are decided. Then, images of the respective blocks based on the smallest thresholds, images of the respective blocks based on the next larger thresholds, . . . are connected to each other to complete slice images in order of the thresholds. The threshold may be interpolated between the blocks to provide smooth change so that the boundary between the blocks may be prevented from being visually recognized in the slice image generated as the result of the connection. For example, the threshold at the center of the block is employed as the threshold defined as the result of tallying up the luminance in this block, and the threshold is interpolated to set a threshold that continuously changes with respect to the position like one shown by a dotted line 136. In fact, the interpolation in this case is performed about the two-dimensional space of the image plane.

Simultaneously with changing the threshold depending on the position, the stacking interval of slice images may also be changed depending on the position. For example, in a case in which a region in which change in the luminance is poor but the height is large, such as a mountain, and a region in which change in the luminance is large but the height is not so large as that of the mountain, such as an urban area, exist in a mixed manner, the difference in the magnitude of undulation between the urban area and the mountain can be produced when the interval of the stacking is set larger in the region in which the dispersion of the luminance is smaller. In FIG. 18, a change 138 in the interval of slice images with respect to the position in the case of employing such setting is shown in association with the luminance distribution. Alternatively, conversely, the interval when slice images are stacked may be set larger in the region in which the dispersion of the luminance is larger.

The accuracy of the image finally displayed can be enhanced by qualitatively acquiring the correspondence relationship between the luminance and the height like the above-described one from an image and adjusting the stacking interval in association with the dispersion of the luminance distribution or the like based on rules according to the correspondence relationship. The method in which the setting of the threshold about the luminance is changed depending on the position and the method in which concavities and convexities are given to a slice image itself by a polygon mesh can be independently introduced. However, they may be used in combination. The method in which the interval of slice images is changed depending on the position may be further combined.

Furthermore, the stacking interval of slice images may be adjusted based on information other than the dispersion of the luminance. For example, when information of a map or the like in which the kind of place such as a road or a coast can be identified in association with an aerial photograph is obtained, the stacking interval of slice images is set small about a region in which the height difference from the ground as the base is small obviously, such as this road or coast. Conversely, the stacking interval is set large about a region in which the height is large obviously, such as a mountain. It is also possible to employ a configuration in which displaying is performed with the stacking interval once set and a user is allowed to adjust the interval while viewing the displaying.

Furthermore, a data set of a raw image and slice images and data in which the stacking interval is associated with the position in the image plane may be compiled to provide image data and an image may be displayed by a device having only the functions of the display processor 30 in FIG. 5. Alternatively, data of a raw image and data showing at least any of the conditions necessary to generate and display slice images, i.e. the number of slice images, the stacking interval, specific thresholds, the shapes of polygon meshes, the block size when block division is carried out, the correspondence relationship between the dispersion and the stacking interval, and so forth, may be compiled to provide image data and an image may be displayed by the image processing device 10.

FIG. 19 shows another configuration example of the image processing device in the present embodiment. In the image processing device 10 shown in FIG. 5, the configuration composed of the image data generator 20, which generates a set of slice images, and the display processor 30, which draws an image with a stereoscopic effect by using slice images, is employed. An image processing device 210 of FIG. 19 generates a set of slice images when drawing an image with a stereoscopic effect. The image processing device 210 includes an input accepting section 212 that acquires an instruction to generate image data and an instruction to display an image from a user, a display unit 214 that displays an image, and an image data acquirer 224 that acquires data of a raw image of the processing target. The image processing device 210 further includes a raw image data storage 222 in which the data of the raw image is stored, a drawing memory 232 in which the data of images necessary for drawing are sequentially stored, and an image drawing section 234 that draws an image with a stereoscopic effect by using data of slice images.

The input accepting section 212, the display unit 214, and the raw image data storage 222 have the same functions as those of the input accepting section 12, the display unit 14, and the raw image data storage 22 in FIG. 5. The image data acquirer 224 acquires data of a raw image and data of height information from the raw image data storage 222 in accordance with an instruction from a user accepted by the input accepting section 212. The image data acquirer 224 may acquire data directly from an image input device such as a camera or a server. Then, the image data acquirer 224 directly supplies the acquired data to the drawing memory 232.

The image drawing section 234 includes a slice image generator 226 inside. Furthermore, when acquiring instruction input of start of displaying, movement of the point of sight, and so forth accepted by the input accepting section 212, the image drawing section 234 reads out data of a raw image of the display target and data of height information from the drawing memory 232 and generates slice images in the slice image generator 226. The actual processing is the same as the processing executed by the slice image generator 26 in FIG. 5. The image drawing section 234 projects the slice images generated by the inside slice image generator 226 onto screen coordinates in order of decreasing distance from the point of sight to thereby make them overlap with each other and draw a display image.

For example, in the case of stereoscopically displaying an image input from a camera in real time, displaying with higher responsiveness can be realized by integrating the generation processing of slice images (images of the alpha value) and the drawing processing and concurrently executing them in this manner. In such a case, if a Gaussian filter is used when the images of the alpha value are smoothed in S24 in FIG. 13, the time to once expand the images of the alpha value on a memory is necessary. Therefore, if the alpha value is interpolated depending on the difference between the threshold of the luminance for generating the slice image and the actual luminance of each pixel as described above, the alpha value can be decided on each pixel basis and thus the efficiency of the concurrent processing with the drawing is enhanced, which is effective for the responsiveness.

Figure 20:
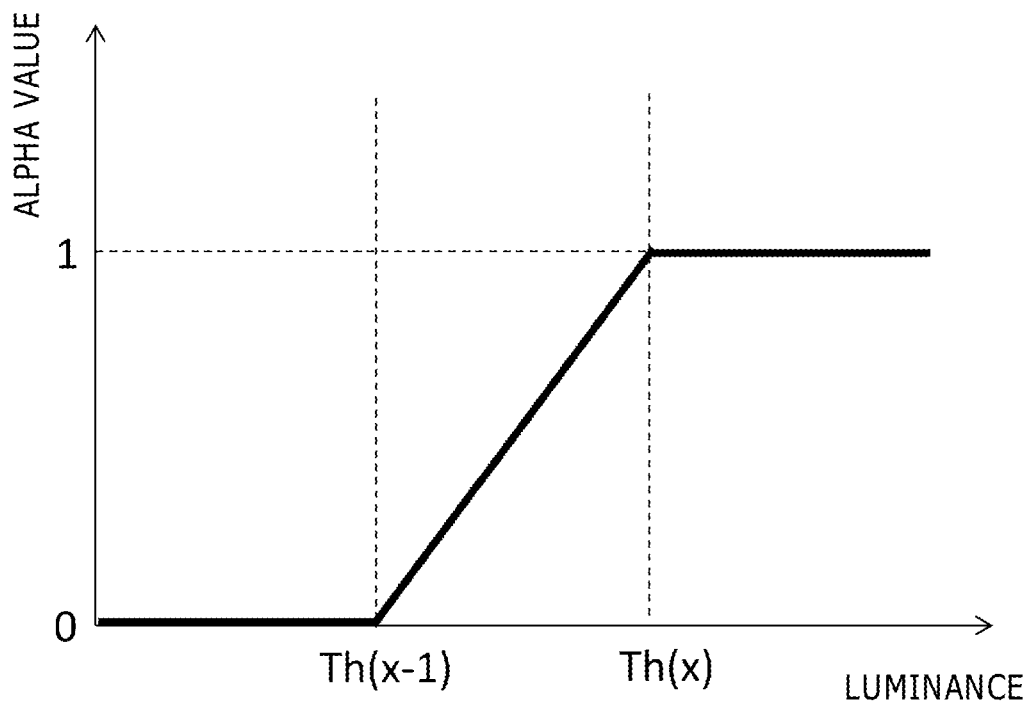
FIG. 20 is a diagram for explaining a method of interpolating the alpha value depending on the difference between the threshold of the luminance for generating a slice image and the actual luminance of each pixel in embodiment 1.

FIG. 20 is a diagram for explaining a method for interpolating the alpha value depending on the difference between the threshold of the luminance for generating the slice image and the actual luminance of each pixel. In this diagram, the abscissa indicates the luminance of the pixel and the ordinate indicates the decided alpha value. A threshold of the luminance set for generating a certain slice image is defined as $Th(x)$ and the next smaller threshold is defined as $Th(x-1)$. In this case, the alpha value of the pixel having luminance equal to or higher than the threshold $Th(x)$ is set to 1 as shown in this diagram. Furthermore, the alpha value of the pixel having luminance equal to or lower than the next smaller threshold $Th(x-1)$ is set to 0. As for the pixel having luminance in the range from $Th(x-1)$ to $Th(x)$, the alpha value is so decided as to change in the range from 0 to 1 according to the magnitude of the luminance as shown in the diagram. In this diagram, the interpolation is so performed that the alpha value linearly changes with respect to the luminance. However, this does not intend to limit the configuration thereto and any of existing interpolation methods may be used.

In this example, the alpha value and an interpolation value thereof are prescribed for each pixel according to the luminance. However, when height information of the object is obtained, the alpha value may be prescribed according to the height of the object instead of the luminance. That is, the alpha value of a region having height equal to or larger than a threshold of the height set about a certain slice image is set to 1 and the alpha value of a region having height equal to or smaller than the next smaller threshold is set to 0.

Furthermore, as for a region having height between these thresholds, the alpha value is so decided as to change in the range from 0 to 1 according to the magnitude of the height.

Figure 21:
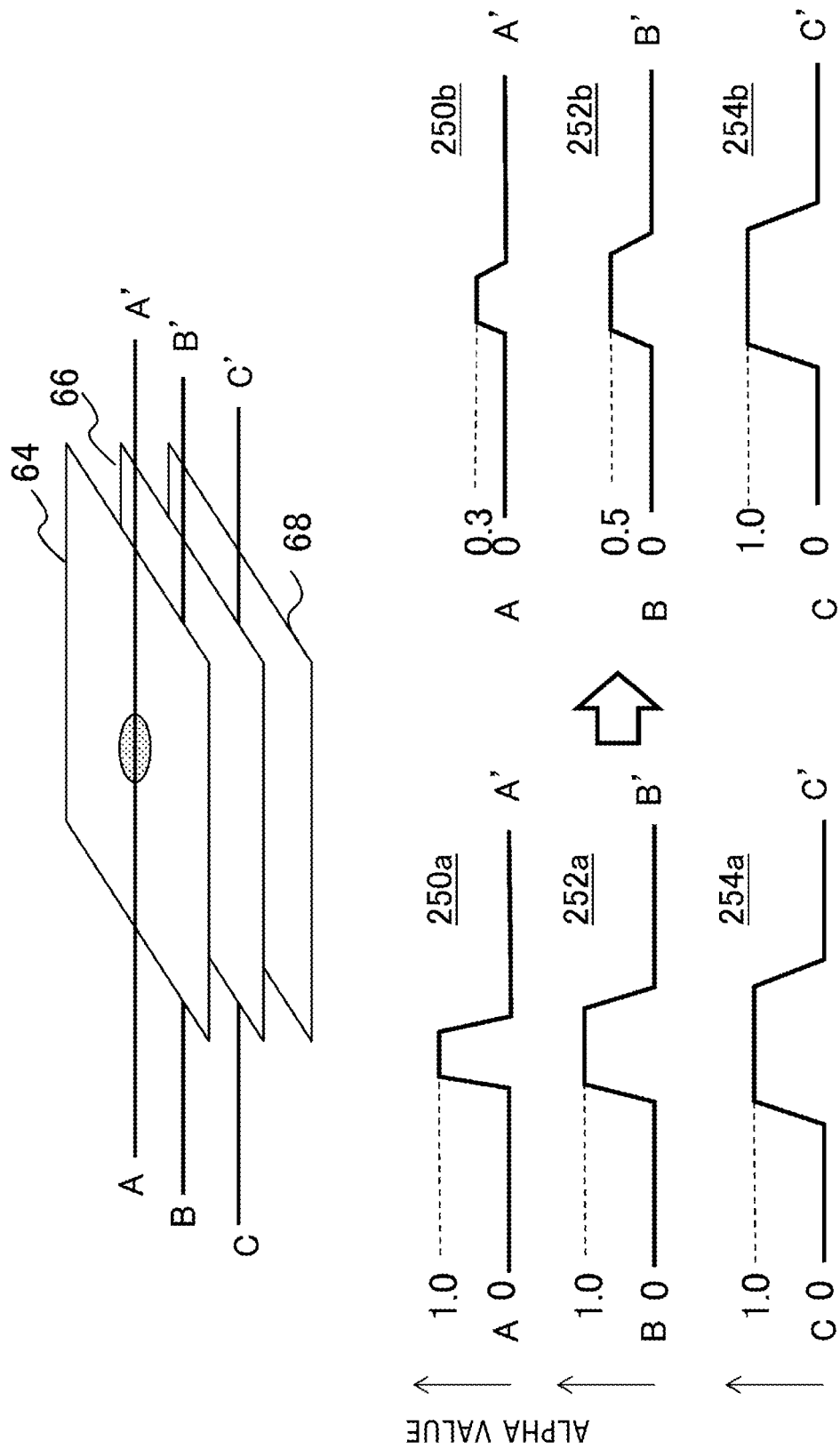
FIG. 21 is a diagram schematically showing distributions of the alpha value of slice image in a case in which the maximum alpha value is fixed at 1 and a case in which it is changed on each slice image basis in embodiment 1.

In the mode described thus far, irrespective of whether or not interpolation of the alpha value like that shown in FIG. 20 is performed, the alpha value of the pixel having luminance equal to or higher than the threshold set on each slice image basis is set to a fixed value of 1. However, the alpha value may be set to a value other than it. That is, the maximum alpha value may be set to a value smaller than 1 in all slice images or may be changed on each slice image basis. FIG. 21 schematically shows distributions of the alpha value of the slice image in a case in which the maximum alpha value is fixed at 1 and a case in which it is changed on each slice image basis.

The way of showing the diagram is similar to that of FIG. 10. The left side of the lower stage shows a case in which the alpha value of the pixel having luminance equal to or higher than the threshold, i.e. the maximum value of the alpha value, is set to 1.0 similarly to FIG. 10. The distributions of the alpha value of the slice images 64, 66, and 68 are distributions 250a, 252a, and 254a. On the other hand, the right side of the lower stage shows a case in which the maximum value of the alpha value is set smaller in the slice image of the upper layer. The distributions of the alpha value of the slice images 64, 66, and 68 are distributions 250b, 252b, and 254b.

In this example, the maximum alpha value of the slice image 68 of the lowermost layer is set to 1.0. The maximum alpha value of the second slice image 66 is set to 0.5. The maximum alpha value of the slice image 64 of the uppermost layer is set to 0.3. If the maximum value of the alpha value is set smaller in the slice image of the upper layer in this manner, an image in a state in which the upper part of the object fuses with the slice images of the lower layers at a higher degree is obtained, and unnatural protrusions and discontinuous parts appear less readily when an image obtained by stacking is drawn depending on the original image. As a result, the image quality of the contour part of the curved surface can be improved.

Figure 22:
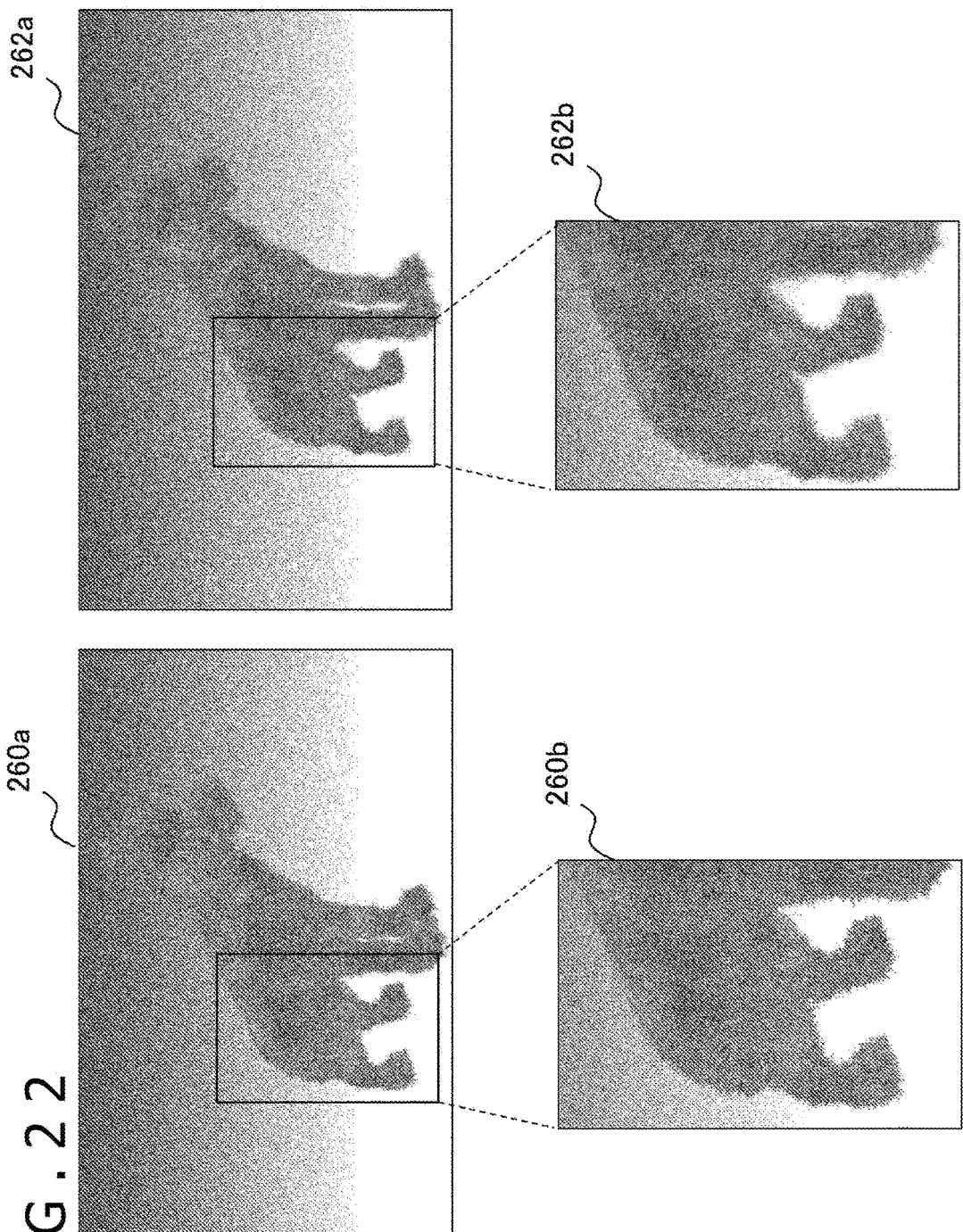
FIG. 22 is a diagram comparing display images actually obtained with the two kinds of setting rules of the maximum alpha value, compared in FIG. 21.

FIG. 22 compares display images actually obtained with the two kinds of setting rules of the maximum alpha value, compared in FIG. 21. Images 260a and 262a are images displayed by using slice images generated from a raw image of a stuffed dog. The image 260a corresponds to a case in which the maximum value of the alpha value is set to 1.0 in all slice images and the image 262a corresponds to a case in which the maximum value of the alpha value is set smaller in the slice image of the upper layer. Furthermore, enlarged images 260b and 262b of part of the respective images are also shown. In the images 260a and 260b obtained by setting the maximum value of the alpha value to 1.0 in all slice images, nap of the surface of the scuffed dog prominently appears and particularly the contour part has a jagged shape. On the other hand, as the images 262a and 262b obtained by changing the maximum value of the alpha value, images in which a soft texture of the surface is expressed and a real impression is given also about the contour part are obtained.

In the case of changing the maximum alpha value on each slice image basis, the numerical values shown in FIG. 21 are merely an example. Specific numerical values and the way of the change are not limited as long as rules are decided in advance so that the maximum alpha value may change with respect to the position of the slice image. For example, besides the case in which the maximum alpha value is set smaller in the upper layer as in FIG. 21, the maximum alpha value may be set larger in the upper layer or the maximum alpha value may be so changed that the maximum value or minimum value is obtained at a predetermined intermediate position. Such rules may be adaptively changed according to the nature of the raw image and so forth.

According to the above-described present embodiment, slice planes when concavities and convexities are assumed in a raw image expressed on a two-dimensional plane are set directly or indirectly and slice images obtained by specifying the region left in the relevant slice plane and making the other region transparent are generated. Then, a three-dimensional object obtained by stacking the slice images on the raw image at predetermined intervals is drawn according to the point of sight to thereby display an image obtained by giving a stereoscopic effect to a two-dimensional image. By employing this, even when the point of sight is moved to a position other than directly above, stereoscopic displaying can be realized with a natural change.

If height information associated with the raw image exists, it is used for the setting of the slice planes. On the other hand, the slice planes may be indirectly set by using information held by the raw image itself, such as the luminance, as an alternative parameter of the height and setting thresholds about it. This allows a stereoscopic image to be generated from only the two-dimensional raw image and eliminates the need to prepare various kinds of data necessary to draw a three-dimensional model. Furthermore, this technique can be easily applied also to various kinds of existing images such as photographs and handwritten pictures. Moreover, because the image can be displayed through overlapping of plural slice images with each other, the load of the display processing is also suppressed.

When thresholds are set about the luminance, the distribution of the thresholds is decided based on the dispersion of the luminance acquired about the whole image or each of blocks obtained by dividing the image. This allows slice images to be optimized in consideration of characteristics of the individual image or each of regions in the image. As a result, many pieces of information can be given to the respective slice images and the retention efficiency of the information is high. Particularly when slice images are generated based on the luminance, change in the height can be expressed in units of pixel and thus delicate concavities and convexities such as hairs can be expressed with a more feeling of realism. Moreover, when concavities and convexities are given to the slice images themselves by polygon meshes, even overall undulation can also be expressed and stereoscopic expression is enabled irrespective of the scale of the concavities and convexities. Furthermore, by changing the stacking interval of the slice images according to the position in the image, the region that should be made stereoscopic and the region that should be made flat can be adjusted, which enables further enhancement in the display accuracy.

Embodiment 2

In embodiment 1, slice images are generated from a raw image and a state in which they are stacked in a three-dimensional space is projected onto a screen to thereby give a stereoscopic effect to an object. In the present embodiment, an image generated by a similar method is so drawn as to be offset on a two-dimensional plane and thereby a figure or character in a raw image is processed. Specifically, by setting the alpha value of the figure or character part as the processing target to 1 and setting the alpha value of the other region to 0, an image in which the region other than this figure or character is made transparent is generated.

Then, the generated image is drawn on the raw image in a superimposed manner at a position offset by a predetermined slight amount. The width of the character or line is thereby increased or the area of the figure is increased. That is, the region of the pixels configuring the character, line, or figure is extended. Hereinafter, this processing will be generically referred to as the "line width increasing." However, not only simply increasing the line width but also increasing the area of a figure shall be included therein. Furthermore, an image in which the alpha value is set in the above-described manner will be defined as the "superposition image" and be separated from the slice image.

FIG. 23 shows the configuration of an image processing device according to the present embodiment. An image processing device 310 includes an input accepting section 312 that accepts instruction input relating to image displaying from a user, a display unit 314 that displays an image, and a raw image data storage 322 in which data of a raw image is stored. The image processing device 310 further includes an image data acquirer 324 that acquires the data of the raw image of the display target, a drawing memory 332 in which the data of images necessary to generate a display image are stored, and a display processor 330 that generates the display image. Similarly to embodiment 1, functions of game, content displaying, and various kinds of information processing and so forth may be further included in the image processing device 10.

The input accepting section 312 accepts, from a user, instruction input of start of displaying, specifying of an image or information of the display target, specifying of the display condition, and so forth and notifies it to the image data acquirer 324 and the display processor 330. Here, the specifying of the display condition includes operation carried out for a display image in a general information processing device, such as screen scrolling and page turning, and an instruction to execute line width increasing and specifying of a region, figure, character, etc. deemed as the target of the line width increasing. The input accepting section 12 may be any of general input devices such as mouse, keyboard, controller, and joystick or may be a touch panel or the like mounted on the screen of the display unit 14. The display unit 14 may be a display device that displays an image as a single unit, such as a liquid crystal display or a plasma display, or may be a combination of a projector that projects an image and a screen, or the like.

Data of a raw image is stored in the raw image data storage 322. However, similarly to embodiment 1, the data of the raw image may be acquired from external apparatus, specifically e.g. a server connected via a network or an image input device such as a camera (neither is shown in the diagram). In accordance with an instruction from a user accepted by the input accepting section 312, the image data acquirer 324 acquires the data of the raw image of the display target from the raw image data storage 322, an image input device such as a camera, a server, or the like and stores it in the drawing memory 332.

The display processor 330 includes an image drawing section 334 that draws a display image to be displayed by the display unit 314 and a superposition image generator 326 that generates a superposition image from data of a raw image. Basically the image drawing section 334 generates the display image similarly to generation in a general information processing device. For example, the image drawing section 334 decodes image data that is stored in the drawing memory 332 and is subjected to compression coding. Alternatively, the image drawing section 334 interprets data described by a markup language, such as a web page, to generate a vector image and rasterize it. Furthermore, the image drawing section 334 may generate data of an image representing a result of a game or various kinds of information processing executed by a functional block that is not shown in the diagram in accordance with a request from this functional block. Hereinafter, the general image generated in this manner will be referred to as the "base image." The base image is generated as a raster image irrespective of the data format of the original image.

The data of the generated base image is expanded in the drawing memory 332 in advance. Furthermore, the display processor 330 draws the superposition image generated by the superposition image generator 326 on this base image in a superimposing manner with the position offset by a predetermined slight amount. At this time, the display processor 330 may draw it only one time or may draw it plural times with changes in the offset amount and the position.

The superposition image generator 326 generates the superposition image by using the base image generated by the image drawing section 334. The superposition image is an image in which the region other than a figure or character of the target of line width increasing is made transparent as described above. However, the superposition image generator 326 may generate data of an alpha image having only the alpha component in the superposition image. In this case, the image drawing section 334 may substantially complete the superposition image by combining the alpha value of each pixel represented by this alpha image with the RGB values of the base image at the stage of drawing the superposition image on the base image. The data of the image generated by the superposition image generator 326 is also stored in the drawing memory 332 to thereby allow the image drawing section 334 to use it.

Figure 24:
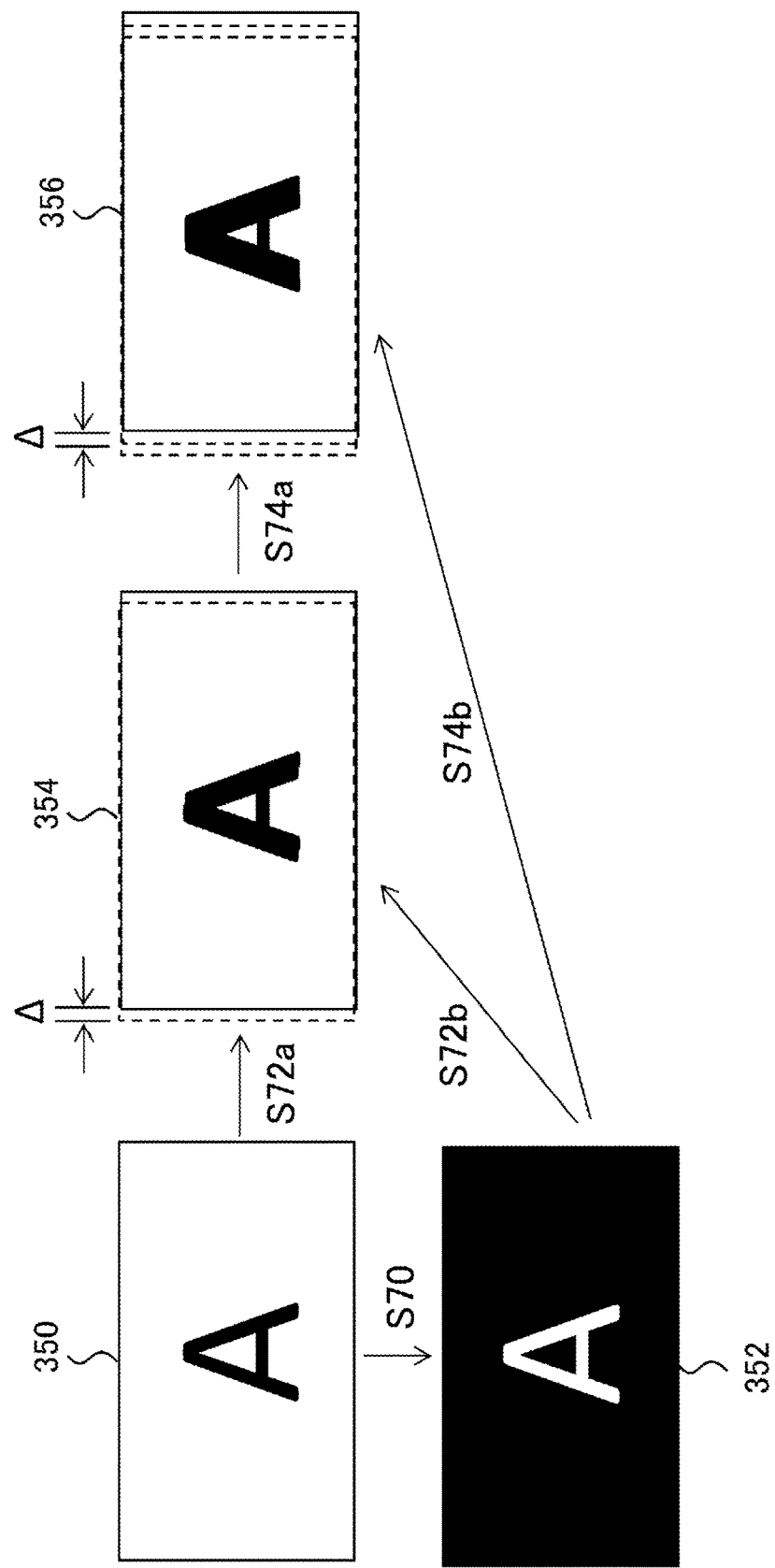
FIG. 24 is a diagram showing a transition example of an image generated by a display processor of embodiment 2.

FIG. 24 shows a transition example of the image generated by the display processor 330. First, an image 350 is a base image generated by the image drawing section 334. In this example, a black character "A" is represented against a white background. A consideration will be made below about a case in which the character "A" is employed as the target of line width increasing in such an image. In this case, the superposition image generator 326 decides the alpha value of a superposition image for each pixel based on the base image 350 (S70). In this diagram, an alpha image 352 obtained by representing the decided alpha value as an image is shown. In this example, the alpha value of the character part is set to 1 and the alpha value of the region other than the character, i.e. the region of the white background, is set to 0. Thus, the character part is white and the background is black in the alpha image 352 as shown in the diagram.

To generate such an alpha image, an alpha value $\alpha_i$ can be obtained for each pixel based on the following expression when the luminance of the i-th pixel in the base image is defined as $Y_i$ ($0 \le Y_i < 1$) for example.

$$\alpha_i = 1.0 - Y_i \qquad \text{(expression 1)}$$

That is, $\alpha_i = 0$ is satisfied in the pixel in the white background because $Y_i = 1.0$ and $\alpha_i = 1$ is satisfied in the pixel in the black character because $Y_i = 0$. The luminance $Y_i$ of each pixel is obtained from the base image 350.

If the base image 350 is an RGB image, normalized elements of the respective pixel values are defined as $R_i$ ($0 \le R_i \le 1$), $G_i$ ($0 \le G_i \le 1$), and $B_i$ ($0 \le B_i \le 1$) and the luminance $Y_i$ is obtained based on the following expression.

$$Y_i = (R_i + G_i + B_i)/3 \qquad \text{(expression 2)}$$

The respective elements may be weighted in expression 2. However, to clearly represent the contour of the target of line width increasing, such as a character, it is preferable that basically the alpha value is a binary value, i.e. the alpha value of the part of the target of line width increasing is set to 1.0 and the alpha value of the other part is set to 0. Therefore, the following scheme may be employed. Specifically, a threshold is set about $Y_i$ and a threshold determination is made about pixels whose luminance $Y_i$ takes a value of $0<Y_i<1$. Furthermore, the alpha value of pixels whose $Y_i$ is close to 0 is set to 1.0 and the alpha value of the other pixels is set to 0.

The image drawing section 334 draws the superposition image having the alpha image 352 as the alpha component of the base image 350 on the base image 350 in a superimposing manner (S72a, S72b). At this time, the superposition image is so drawn as to be offset from the base image by a predetermined slight amount Δ nd thereby an image in which the line width of the character "A" is increased like an image 354 is obtained. That is, even when the superposition image in which the region other than the character is made transparent is drawn in a superimposed manner, the character of the base image appears to be left corresponding to the offset width Δ and thus the line width of the character increases as a result. In this diagram, the end of the base image 350 is represented by a dotted line and the end of the superposition image is represented by a solid line.

The image drawing section 334 may further draw the superposition image on the image 354 in a superimposing manner (S74a, S74b). At this time, the superposition image is so drawn as to be further offset from the position at which the superposition image is drawn previous time by the slight amount Δ and thereby an image 356 in which the line width of the character "A" is further increased is obtained. In this diagram, the ends of the base image 350 and the superposition image drawn previous time are represented by dotted lines and the end of the superposition image drawn last is represented by a solid line.

In the example of FIG. 24, only the horizontal width of the line of the character is increased through the offset of the image only in the horizontal direction of the diagram. However, the offset direction is not limited thereto. For example, it is also possible to increase the width in all directions by offsetting the image in all orientations evenly. Only the vertical width may be increased by offsetting the image only in the vertical direction. The optimum values are appropriately decided about such an offset direction, the number of times of superposition drawing, and the offset width Δ in one time of drawing in view of the size, kind, and original line width of a figure or character of the target of line width increasing, the processing capability of the device, the resolution of the display, and so forth. The correspondence relationship among these parameters may be set in advance and the optimum values may be appropriately selected at the stage of displaying.

Figure 25:
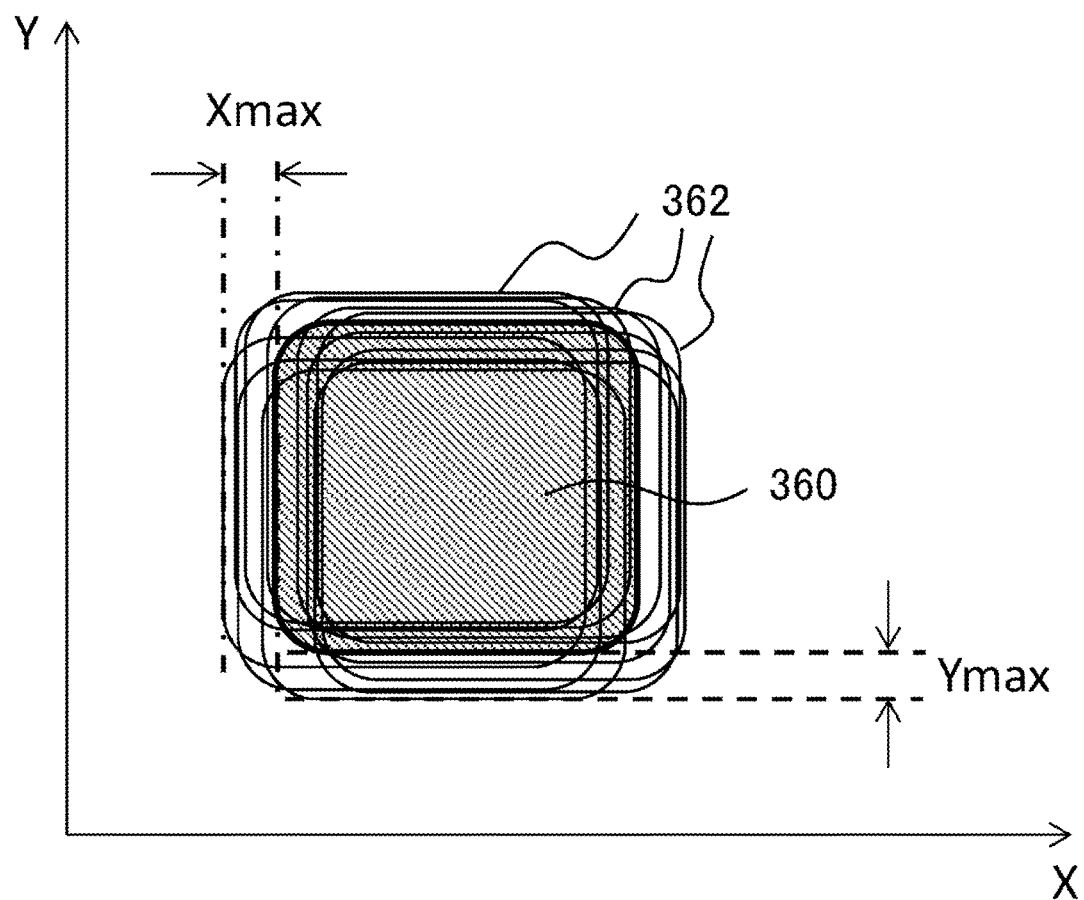
FIG. 25 is a diagram for explaining the offset width of a superposition image in embodiment 2.

FIG. 25 is a diagram for explaining the offset width of the superposition image. In this diagram, it is assumed that a hatched square 360 having rounded corners is employed as the target of line width increasing and both the vertical width and the horizontal width are increased by drawing the superposition image on the square 360 in a superimposing manner plural times. In this diagram, for discrimination from the original square 360, only the contour line is represented by a thin line about squares 362 in the respective superposition images drawn in plural times of drawing. In fact, the same color as that of the original square 360 is put in the regions inside the squares 362. The whole square can be thereby increased in width (in size) at the end of the drawing.

In the image drawing section 334, the maximum offset widths (Xmax, Ymax) with respect to the original figure are set in the horizontal direction (X-direction) and the vertical direction (Y-direction) in advance. The maximum offset widths may be set constant irrespective of figure and character, or may be changed depending on attributes thereof, specifically e.g. the font of a character, the kind of line or figure, and so forth. For example, in the case of a font having a characteristic that horizontal lines included in a character are thinner than vertical lines, the horizontal lines can be made thicker by setting the maximum offset width in the vertical direction larger than the maximum offset width in the horizontal direction. If the maximum offset width in either direction is set to 0, it is also possible to increase the line width only in one direction as in the example of FIG. 24.

Furthermore, particularly in the case of a character, it is preferable that the maximum offset width is so set as to avoid a situation in which a hollow part surrounded by lines is blacked out and the character becomes less legible. Therefore, the ratio of the maximum offset width to the original character size may be set in advance and the absolute value of the maximum offset width may be decided according to the actual character size. This is the same also about the figure. After the maximum offset width is decided in this manner, offset widths ($W_X$, $W_Y$) of every drawing of the superposition image are decided within ranges of $0<|W_X|\leq Xmax$ and $0<|W_Y|\leq Ymax$. For example, random numbers in these ranges are generated and decided for the number of times of drawing. Alternatively, the offset widths may be decided in accordance with a predetermined rule. Specifically, for example each offset width may be set at an equal interval or the number of times of drawing may be increased when the offset width is smaller or larger. Such a rule may also be switched depending on attributes of a figure or character and so forth.

FIG. 26 shows a screen example displayed on the display unit 314. The left side of the diagram is a base image 370 on which a superposition image is not drawn and represents a web page showing a timetable of a station and service information of trains. The right side of the diagram is a display image 372 after the superposition image is drawn in a superimposed manner. Comparison with the base image 370 proves that the line widths of the numbers as the main body of the timetable are increased due to the drawing of the superposition image. Furthermore, in this example, no change is caused in the characters other than these numbers. A processed region and an unprocessed region may be mixed in one image in this manner.

For example, only a region about which a range is specified by a user may be subjected to line width increasing. Alternatively, image regions may be delimited in advance for each of items of articles to be displayed for example and an item selected by a user may be employed as the target of line width increasing. In this case, delimitation information of the image is added to image data in advance. Furthermore, the superposition image generator 326 clips only the region selected by the user from a base image and then generates a superposition image to draw the superposition image at a position offset by a slight amount from the region of the clipping source on the base image. In the case of FIG. 26, only a region 374 representing the timetable main body in the base image 370 is selected. As a result, only the numbers in a region 376 are subject to line width increasing in the display image 372.

Furthermore, it is also possible to decide the target of line width increasing based on the color of figures and characters. For example, when only red characters are employed as the target of line width increasing, a superposition image is generated that is obtained by setting, to 1, the alpha value of pixels in which the R component in the RGB components of the pixel values is large and the other components are close to 0 and setting the alpha value of the other pixels to 0. Various methods will be available as the method for extracting pixels whose alpha value is set to 1, i.e. pixels representing the figure or character of the target of line width increasing, based on the color. For example, a threshold may be set for each of the RGB components of the pixel values or a region employed as the extraction condition may be set in a color space.

Furthermore, in the case of content whose main constituent elements are a background and characters and figures described thereon, such as a web page or an electronic book, the pixels configuring the background may be extracted based on the color and the other pixels may be estimated to configure the characters and figures of the target of line width increasing. For example, a color histogram representing the color distribution in the image is created and the color that is the largest in the number of pixels is identified as the background color. A superposition image is then generated by setting the alpha value of pixels having the background color to 0 and setting the alpha value of the other pixels to 1. This allows only the figures and characters to be subjected to line width increasing without limiting the color. The alpha value may be decided on each color basis by adding color information of the background and characters to image data in advance. If the original information is described by a markup language as in a web page or the like, the color information of the background and characters may be read out from it.

Next, operation implemented by the configuration described thus far will be described. FIG. 27 is a flowchart showing the processing procedure of image displaying carried out by the image processing device in the present embodiment. First, in accordance with specifying of image data or the like by a user, the image data acquirer 324 acquires data of a raw image of the display target from the raw image data storage 322 or the like (S80). This processing may appropriately include processing of acquiring or generating the information necessary to generate a display image, of general information processing, such as processing of acquiring data of a web page corresponding to a URL specified by a user via a network and processing of creating basic data of a document in which an input made to an application of document creation or the like by a user is reflected. The acquired data is stored in the drawing memory 332.

Next, the image drawing section 334 of the display processor 330 draws a base image by using the data stored in the drawing memory 332 (S82). As described above, this processing may be similar to general image drawing processing. If line width increasing is carried out only when a user makes an instruction, first this base image is displayed on the display unit 314 (N of S84, S90). If originally setting is so made that line width increasing is carried out or if a user orders line width increasing after seeing the display image or specifies the region thereof and thus the need for the line width increasing is caused (Y of S84), the superposition image generator 326 first identifies the region of the target of the line width increasing and attributes such as the color (S84).

The region of the target of the line width increasing and the attributes may be specified by the user as described above or may be set in advance as additional data of image data. The superposition image generator 326 clips the identified region from the base image according to need and then generates a superposition image or an alpha image representing only the alpha component thereof (S86). Subsequently, the image drawing section 334 acquires the generated data of the superposition image generator 326 and repeats processing of drawing the superposition image on the base image in a superimposing manner with an offset a set number of times (S88). The offset width is changed every time the drawing is performed as described above.

After the last drawing is completed, the image drawing section 334 outputs the image data resulting from the drawing to the display unit 314 and thereby a display image in which the line width has been increased is displayed (S90). Every time a new image display instruction from the user is input, the processing of S80 to S90 is repeated and thereby an image in which the necessary part is so displayed as to be thick according to need can be displayed.

According to the present embodiment described above, a superposition image is generated in which the alpha value of the part of a figure or character desired to be increased in width or in size in an image of the display target is set to 1 and the alpha value of the other region is set to 0. The superposition image is drawn and displayed on the original image in a superimposed manner with an offset by a slight amount. This allows the desired figure or character to be easily increased in width or in size with a light processing load.

When the original data is a vector image such as a web page, it is general to change the font of characters or turn the characters to thicker ones at the stage of the vector image according to user's operation. However, when this is employed, a situation will occur in which characters originally configuring one row become too large to fall within the width of one row of the screen and a line break or page break is made halfway by automatic adjustment of a device. For example, in the case of the timetable in FIG. 26, if the sequences of numbers representing times in the respective time zones do not fall within the width of the surrounding line and line breaks are made due to change of the font or the like, the characters become difficult to understand as information of the timetable although the individual characters become more visible. Furthermore, impairing of the original page design will also be caused. In particular, in the case of displaying content in which even the distribution of text in a page is also meaningful, such as an electronic book, line break and page break due to change of the font are not preferable.

In the present embodiment, it is possible to make a line itself thicker without changing the layout of characters and therefore the above-described trouble is not caused. Furthermore, a character can be made thicker irrespective of the kind of character. In addition, not only characters but also lines and figures can be made thicker. Moreover, in the superposition image, the part of a figure or character of the target of line width increasing is left as it is and the other region is made transparent. Thus, the contour line of this figure or character is clear. Therefore, although it is so drawn as to be superimposed on a base image, the contour line is always in the clear state irrespective of the number of times of drawing and figures and characters in a display image are easily visible. Furthermore, recesses of jaggies, which tend to be a problem in an oblique line, can be filled by the superposition image and therefore an effect of antialiasing is also obtained. When antialiasing is the purpose, instead of limiting the alpha value of the superposition image to 1 or 0, an intermediate value may be used so that a smoother contour may be obtained.

Moreover, the line width and the smoothness of the contour can be adjusted by adjusting the maximum offset amount and the number of times of drawing. Furthermore, only a desired object can be subjected to line width increasing by limiting the region and attribute. As a result, flexible processing that reflects demands of a user or image creator is possible. In addition, the processing of superposition drawing can be implemented by using a rendering function in a GPU mounted in a general information processing device and thus the load of another module such as a CPU does not increase.

The present invention is described above based on the embodiments. The above-described embodiments are exemplification, and it will be understood by those skilled in the art that various modification examples are possible in the combinations of the respective constituent elements and the respective processing processes of them and such modification examples also fall within the scope of the present invention.

REFERENCE SIGNS LIST

10 Image processing device, 12 Input accepting section, 14 Display unit, 20 Image data generator, 22 Raw image data storage, 24 Image data acquirer, 26 Slice image generator, 28 Slice image data storage, 30 Display processor, 32 Drawing memory, 34 Image drawing section, 210 Image processing device, 212 Input accepting section, 214 Display unit, 222 Raw image data storage, 224 Image data acquirer, 226 Slice image generator, 232 Drawing memory, 234 Image drawing section, 310 Image processing device, 312 Input accepting section, 314 Display unit, 322 Raw image data storage, 324 Image data acquirer, 326 Superposition image generator, 330 Display processor, 334 Image drawing section

INDUSTRIAL APPLICABILITY

As described above, the present invention can be used for information processing devices such as computer, image processing device, image display device, information terminal, and game machine.

The invention claimed is:

1. An image processing device for converting an input two-dimensional raw image to an image viewed with a stereoscopic effect, the image processing device comprising:
a making-region-transparent information generator that calculates a height from an image plane for an object represented in two-dimensions in an input two-dimensional raw image and identifies a region reaching a slice plane set about the height to generate information to make a region other than the region transparent
wherein the input two-dimensional raw image is an image in which pixels are arranged in a two-dimensional plane, with each pixel having associated color information; and
an image drawing section that displays a three-dimensional image obtained by giving a stereoscopic effect to the two-dimensional raw image by drawing, according to a position of a point of sight, a three-dimensional object made by stacking slice images in which part of the two-dimensional raw image is made transparent by using the information to make the region transparent over the raw image in a three-dimensional space according to the height of the slice plane that corresponds,
wherein the slice images are two-dimensional images obtained from the input two-dimensional raw image.

2. The image processing device according to claim 1, wherein the making-region-transparent information generator indirectly decides the slice plane by setting a threshold in a predetermined parameter obtained from the input two-dimensional raw image in units of pixel.

3. The image processing device according to claim 2, wherein the making-region-transparent information generator sets a threshold in luminance of each pixel of the input two-dimensional raw image.

4. The image processing device according to claim 2, wherein the making-region-transparent information generator decides distribution of the threshold in association with a result obtained by tallying up the predetermined parameter and executing statistical processing.

5. The image processing device according to claim 2, wherein the making-region-transparent information generator divides the input two-dimensional raw image into a plurality of blocks and then tallies up the predetermined parameter and executes statistical processing for each of the blocks, and the making-region-transparent information generator changes the threshold that is set depending on a position in the image plane in such a manner that the threshold corresponds to a result of the statistical processing.

6. The image processing device according to claim 5, wherein the image drawing section changes an interval of stacking of the slice images depending on the position in the image plane in such a manner that the interval corresponds to the result of the statistical processing.

7. The image processing device according to claim 1, wherein the image drawing section stacks the slice images after deploying the slice images on polygon meshes generated with setting of concavity and convexity based on information on height distribution obtained in association with the raw image.

8. The image processing device according to claim 1, wherein the making-region-transparent information generator includes, in the information to make the region transparent, information to set a boundary region at a boundary between the region reaching the slice plane set about the height and the other region and change transparency in such a manner that the transparency is interpolated in the boundary region.

9. The image processing device according to claim 1, wherein the making-region-transparent information generator changes transparency of the region reaching the slice plane set about the height according to the height.

10. An image processing device comprising:
an image data acquirer that acquires a two-dimensional raw image from a digital camera,
wherein the two-dimensional raw image is an image in which pixels are arranged in a two-dimensional plane, with each pixel having associated color information; and
a slice image generator that calculates height from an image plane for an object represented in two-dimensions in the two-dimensional raw image and identifies a region reaching a slice plane set about the height to generate slice images that are obtained by making a region other than the region transparent and are to display a three-dimensional image obtained by giving a stereoscopic effect to the two-dimensional raw image by being stacked over the two-dimensional raw image in a three-dimensional space according to height of the slice plane that corresponds to perform drawing according to a position of a point of sight, wherein the slice images are two-dimensional images obtained from the two-dimensional raw image.

11. An image processing method comprising:

reading out data of a two-dimensional raw image from a storage device, and calculating a height from an image plane for an object represented in two-dimensions in the two-dimensional raw image, and identifying a region reaching a slice plane set about the height to generate information to make a region other than the region transparent, wherein the two-dimensional raw image is an image in which pixels are arranged in a two-dimensional plane, with each pixel having associated color information; and displaying a three-dimensional image obtained by giving a stereoscopic effect to the two-dimensional raw image on a display device by drawing, according to a position of a point of sight, a three-dimensional object made by stacking slice images in which part of the two-dimensional raw image is made transparent by using the information to make the region transparent over the raw image in a three-dimensional space according to height of the slice plane that corresponds, wherein the slice images are two-dimensional images obtained from the input two-dimensional raw image.

12. A non-transitory computer-readable recording medium in which a computer program for a computer is recorded, the computer program comprising:

calculating a height from an image plane for an object represented in two-dimensions in an input two-dimensional raw image and identifying a region reaching a slice plane set about the height to generate information to make a region other than the region transparent, wherein the input two-dimensional raw image is an image in which pixels are arranged in a two-dimensional plane, with each pixel having associated color information; and displaying a three-dimensional image obtained by giving a stereoscopic effect to the input two-dimensional raw image by drawing, according to a position of a point of sight, a three-dimensional object made by stacking slice images in which part of the input two-dimensional raw image is made transparent by using the information to make the region transparent over the raw image in a three-dimensional space according to height of the slice plane that corresponds, wherein the slice images are two-dimensional images obtained from the input two-dimensional raw image.

* * * * *